(12) United States Patent
Matsushita et al.

(10) Patent No.: US 6,814,298 B2
(45) Date of Patent: Nov. 9, 2004

(54) DIGITAL DATA PRODUCING SYSTEM

(75) Inventors: Masahiro Matsushita, Kanagawa (JP); Takumi Suzuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 498 days.

(21) Appl. No.: 10/013,658

(22) Filed: Dec. 13, 2001

(65) Prior Publication Data

US 2002/0080424 A1 Jun. 27, 2002

(30) Foreign Application Priority Data

Dec. 25, 2000 (JP) ........................................ 2000-393141

(51) Int. Cl.[7] ................................................ G06K 7/14
(52) U.S. Cl. ...................................... 235/494; 707/100
(58) Field of Search .............................. 235/454, 455, 235/494; 707/100, 102, 205

(56) References Cited

U.S. PATENT DOCUMENTS 4,874,936 A * 10/1989 Chandler et al. ........... 235/494
5,459,307 A * 10/1995 Klotz, Jr. .................... 235/454
5,686,718 A * 11/1997 Iwai et al. .................. 235/494
6,098,882 A *  8/2000 Antognini et al. .......... 235/454

* cited by examiner

Primary Examiner—Daniel St. Cyr
(74) Attorney, Agent, or Firm—Sughrue Mion, PLLC

(57) ABSTRACT

A digital data producing system includes a keyboard, a mouse, a data saving memory for saving sets of produced digital data, an additional character string memory for storing at least two sets of additional character strings, and a data file name assigning section for assigning to the sets of produced digital data a data file names produced by selecting one set of additional character strings from among the at least two sets of additional character strings stored in the additional character string memory in accordance with instructions input using the mouse when a naming rule is selected and serially adding members of the thus selected set of additional character strings to a basic data file name. According to the thus constituted digital data producing system, it is possible to simply assign to sets of digital data correlated with each other file names composed of, for example, a common character string plus additional character strings to clarify the correlation between (among) the sets of digital data.

20 Claims, 6 Drawing Sheets

DIGITAL DATA PRODUCING SYSTEM

BACKGROUND OF THE INVENTION

The present invention relates to a digital data producing system and, particularly, to a digital data producing system which can simply assign sets of digital data correlated with each other file names composed of, for example, a common character string and additional serial character that clarify the correlation between (among) the sets of correlated digital data correlated.

DESCRIPTION OF THE PRIOR ART

An autoradiography system using as a detecting material for detecting radiation a stimulable phosphor which can absorb, store and record the energy of radiation when it is irradiated with radiation and which, when it is then stimulated by an electromagnetic wave having a specified wavelength, can release stimulated emission whose light amount corresponds to the amount of radiation with which it was irradiated is known, which comprises the steps of introducing a radioactive labeling substance into an organism, using the organism or a part of the tissue of the organism as a specimen, superposing the specimen and a stimulable phosphor sheet formed with a stimulable phosphor layer for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see, for example, Japanese Patent Publication No. 1-60784, Japanese Patent Publication No. 1-60782, Japanese Patent Publication No. 4-3952 and the like).

Unlike the system using a photographic film, according to the autoradiography system using the stimulable phosphor as a detecting material, development, which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescence detecting system using a fluorescent substance as a labeling substance instead of a radioactive labeling substance in the autoradiography system is known. According to this system, it is possible to study a genetic sequence, to study the expression level of a gene, and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed, or distributing a plurality of DNA fragments on a gel support containing a fluorescent dye, or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescent light, detecting the released fluorescent light to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

Further, a micro-array detecting system has been recently developed, which comprises the steps of using a spotting device to drop at different positions on the surface of a carrier such as a slide glass plate, a membrane filter or the like specific binding substances, which can specifically bind with a substance derived from a living organism such as a hormone, tumor marker, enzyme, antibody, antigen, abzyme, other protein, a nuclear acid, cDNA, DNA, RNA or the like and whose sequence, base length, composition and the like are known, thereby forming a number of independent spots, specifically binding the specific binding substances using a hybridization method or the like with a substance derived from a living organism such as a hormone, tumor marker, enzyme, antibody, antigen, abzyme, other protein, a nuclear acid, cDNA, DNA or mRNA, which is gathered from a living organism by extraction, isolation or the like or is further subjected to chemical processing, chemical modification or the like and which is labeled with a labeling substance such as a fluorescent substance, dye or the like, thereby forming a micro-array, irradiating the micro-array with a stimulating ray, photoelectrically detecting light such as fluorescence emitted from a labeling substance such as a fluorescent substance, dye or the like, and analyzing the substance derived from a living organism. This micro-array image detecting system is advantageous in that a substance derived from a living organism can be analyzed in a short time period by forming a number of spots of specific binding substances at different positions of the surface of a carrier such as a slide glass plate at high density and hybridizing them with a substance derived from a living organism and labeled with a labeling substance.

In the micro-array system, sets of digital data corresponding to a plurality of micro-arrays for biochemical analysis are produced by irradiating a plurality of micro-arrays prepared by hybridizing substances gathered from the same living organism or the same kind of living organisms with a specific binding substance spotted on the surface of a substrate such as a slide glass plate, a membrane filter or the like with a stimulating ray and photoelectrically detecting light such as fluorescence emission released from a labeling substance such as a fluorescent substance, a dye or the like and the sets of digital data are often stored in a memory of a computer or the like for effecting analysis later.

In such a case, the general practice is to assign data file names to the sets of digital data for biochemical analysis and the sets of digital data are stored in a memory of a computer but in the case where the sets of digital data are correlated with each other as in the case of sets of digital data produced from substances gathered from the same living organism or the same kind of living organisms, it is preferable for improving ease-of-use to assign a common data file name to the sets of digital data using a common character string and further assign symbols such as an additional character string or the like capable of clarifying the correlation between (among) the sets of digital data, thereby storing them in a memory of a computer.

However, it is extremely troublesome to enter a common character string in order to respectively assign a common data file name to the sets of digital data produced from substances gathered from the same living organism or the same kind of living organisms and further enter additional character strings or the like in order to clarify the correlation.

Particularly, since the data file names to be assigned to the sets of digital data for biochemical analysis produced from a plurality of micro-arrays have no specific meaning themselves, it lowers the efficiency of operation and the utility of the micro-array system to force the user to enter a common character string, additional character strings and the like.

A similar problem occurs not only in the micro-array system but also in the case of assigning a common data file name which has no specific meaning to sets of digital data correlated with each other using a common character string or the like, further assigning additional character strings thereto in order to clarify the correlation and storing them in a memory of a computer.

SUMMARY OF THE INVENTION

It is therefore an object of the present invention to provide a digital data producing system which can simply assign to sets of digital data correlated with each other file names composed of a common character string plus an additional character string in order to clarify the correlation between (among) the sets of digital data correlated with each other.

The above and other objects of the present invention can be accomplished by a digital data producing system comprising input means, data saving means for saving sets of produced digital data, additional character string storing means for storing at least two sets of additional character strings, and data file name assigning means for assigning to the sets of produced digital data data file names produced by selecting one set of additional character strings from among the at least two sets of additional character strings stored in the additional character string storing means in accordance with instructions input through the input means when a naming rule is selected and adding members of the thus selected set of additional character strings to a basic data file name.

According to the present invention, a digital data producing system comprises input means, data saving means for saving sets of produced digital data, additional character string storing means for storing at least two sets of additional character strings, and data file name assigning means for assigning to the sets of produced digital data data file names produced by selecting one set of additional character strings from among the at least two sets of additional character strings stored in the additional character string storing means in accordance with instructions input through the input means when a naming rule is selected and adding members of the thus selected set of additional character strings to a basic data file name, and, therefore, file names composed of a common basic data file name and additional character strings can be assigned to sets of digital data correlated with each other by selecting the naming rule using the input means, entering a basic file name through the input means and selecting one set of additional character strings from among the at least two sets of additional character strings stored in the additional character string storing means. As a result, data file names can be simply assigned to sets of digital data correlated with each other so as to clarify the correlation between the sets of digital data.

In a preferred aspect of the present invention, a data saving region having a data region name associated with the data file names is produced in the data saving means and the sets of digital data assigned the data file names are saved in the data saving region having an associated data region name.

According to this preferred aspect of the present invention, since a data saving region having a data region name associated with the data file names is produced in the data saving means and the sets of digital data assigned the data file names are saved in the data saving region having an associated data region name, it is possible to easily retrieve the sets of digital data saved in the data saving means.

In a further preferred aspect of the present invention, the data file name assigning means is constituted so as to serially add, when a continuative assigning mode is selected by the input means, members of the set of additional character strings selected in accordance with instructions input through the input means to the basic data file name entered through the input means, thereby creating the data file names and to assign the thus created data file names to the sets of produced digital data.

According to this preferred aspect of the present invention, since the data file name assigning means is constituted so as to serially add, when a continuative assigning mode is selected by the input means, members of the set of additional character strings selected in accordance with instructions entered through the input means to the basic data file name entered through the input means, thereby creating data file names and to assign the thus created data file names to the sets of produced digital data, it is possible to assign data file names having additional serial character strings to sets of digital data correlated with each other so as to clarify the correlation between the sets of digital data.

In a further preferred aspect of the present invention, when a continuative assigning mode is selected by the input means, defined data saving regions are serially created in the data saving means, members of the set of additional character strings selected in accordance with instructions input through the input means are serially added to the basic data file name entered through the input means, thereby creating data region names and assigning them to the data saving regions and the sets of digital data assigned the data file names are saved in the data saving regions having data region names associated with the assigned data file names.

According to this preferred aspect of the present invention, when a continuative assigning mode is selected by the input means, defined data saving regions are serially created in the data saving means, members of the set of additional character strings selected in accordance with instructions input through are serially added to the basic data file name entered through the input means, thereby creating data region names and assigning them to the data saving regions and the sets of digital data assigned the data file names are saved in the data saving regions having data region names associated with the assigned data file names and, therefore, it is possible to save sets of digital data having a common basic data file name in a data saving region constituting a single folder or the like and to easily retrieve the sets digital data saved in the data saving means.

In a further preferred aspect of the present invention, the data file name assigning means is constituted so as to repeatedly with a predetermined unit of repetition and serially add, when a repetitive assigning mode is selected by the input means, members of the set of additional character strings selected in accordance with instructions input through the input means to the basic data file name entered through the input means, thereby creating data file names, and to assign the thus created data file names to the sets of produced digital data.

According to this preferred aspect of the present invention, the data file name assigning means is constituted so as to repeatedly with a predetermined unit of repetition and serially add, when a repetitive assigning mode is selected by the input means, members of the set of additional character strings selected in accordance with instructions input through the input means to the basic data file name entered through the input means, thereby creating data file names, and to assign the thus created data file names to the sets of produced digital data, and, therefore, it is possible to simply assign data file names having repeated additional serial character strings with a predetermined unit of repetition to sets of digital data correlated with each other so as to clarify the correlation between the sets of.

In a further preferred aspect of the present invention, when a repetitive assigning mode is selected by the input means, defined data saving regions are serially created in the data saving means, members of the set of additional character strings selected in accordance with instructions input through the input means are repeatedly with a predetermined unit of repetition and serially added to the basic data file name entered through the input means, thereby creating data region names and assigning them to the data saving regions, and the sets of digital data assigned the data file names are saved in the data saving regions having data region names associated with the assigned data file names.

According to this preferred aspect of the present invention, when a repetitive assigning mode is selected by the input means, defined data saving regions are serially created in the data saving means, members the set of additional character strings selected in accordance with instructions input through the input means are repeatedly with a predetermined unit of repetition and serially added to the basic data file name entered through the input means, thereby creating data region names and assigning them to the data saving regions, and the sets of digital data assigned the data file names are saved in the data saving regions having data region names associated with the assigned data file names and, therefore, it is possible to save sets of digital data having a common basic data file name in the data saving regions included in a single folder or the like and to easily retrieve the sets of digital data saved in the data saving means.

In a further preferred aspect of the present invention, the data file name assigning means is constituted so as to create data file names in accordance with data file names entered through the input means and assign the thus created data file names to the sets of produced digital data when a naming rule is not selected.

In a further preferred aspect of the present invention, a data saving region having the same data region name as a basic data file name is created in the data saving means for each basic data file name entered through the input means.

In a further preferred aspect of the present invention, the digital data producing system further comprises a display means and the at least two sets of additional character strings stored in the additional character string storing means are displayed on the display means when the naming rule is selected.

According to this preferred aspect of the present invention, since the digital data producing system further comprises a display means and the at least two sets of additional character strings stored in the additional character string storing means are displayed on the display means when the naming rule is selected, it is possible to very easily select additional character strings to be assigned to a basic data file name and assign the thus selected additional character strings to the sets of produced produced digital data together with the basic data file name.

In a preferred aspect of the present invention, the input means is constituted so as to select one set of additional character strings from among the at least two sets of additional character strings displayed on the display means.

According to this preferred aspect of the present invention, since the input means is constituted so as to select one set of additional character strings from among the at least two sets of additional character strings displayed on the display means, it is possible to very easily select additional character strings to be assigned to a basic data file name and assign the thus selected additional character strings to the sets of produced digital data together with the basic data file name.

In a further preferred aspect of the present invention, a warning is displayed on the display means when the same basic data file name as one already entered through the input means is entered through the input means.

In a further preferred aspect of the present invention, the input means is constituted of a keyboard and a mouse, the basic data file name is entered through the keyboard and stored in the additional character string storing means, an additional character string selection signal is input to the data file name assigning means when the one set of additional character strings is selected by the mouse from among the at least two sets of additional character strings, and the data file name assigning means selects the one set of additional character strings from among the at least sets of additional character strings stored in the additional character string storing means, adds them to the basic data file name to create data file names and assigns them to the sets of produced digital data.

According to this preferred aspect of the present invention, the input means is constituted of a keyboard and a mouse, the basic data file name is entered through the keyboard and stored in the additional character string storing means, an additional character string selection signal is input to the data file name assigning means when the one one of additional character strings is selected by the mouse from among the at least two sets of additional character strings, and the data file name assigning means selects the one set of additional character strings from among the at least two sets of additional character strings stored in the additional character string storing means, adds them to the basic data file name to create data file names and assigns them to the sets of produced digital data and, therefore, additional character strings to be added to a basic data file name can be selected merely by selecting one set of additional character strings from among the at least two sets of additional character strings displayed on the display means by the mouse and it is possible to very easily assign the basic data file name and the additional character strings to the sets of produced digital data.

In a further preferred aspect of the present invention, the data file name assigning means is constituted so as to add the additional character strings to the terminal end of the basic data file name entered through the input means.

In a further preferred aspect of the present invention, the data file name assigning means is constituted so as to add the additional character strings to the front end of the basic data file name entered through the input means.

In a further preferred aspect of the present invention, the digital data producing system further comprises at least one laser stimulating ray source for emitting a laser beam, a sample stage on which at least one sample containing a labeling substance is to be placed, scanning means for moving the sample stage so that the sample placed on the sample stage can be scanned with the laser beam emitted from the at least one laser stimulating ray source, a light detector for photoelectrically detecting light released from the labeling substance contained in the sample upon being scanned with the laser beam emitted from the at least one laser stimulating ray source and excited thereby and producing analog data, and an A/D converter for digitizing the analog data produced by the light detector to produce digital data, and the data file name assigning means is constituted so as to add a designation indicating wavelength of the laser beam scanning the sample to the basic data file name entered through the input means or a data file name created by adding a member of the set of additional character strings to the basic data file name entered through the input means to create a final data file name and assign the final data file name to the set of digital data produced by the A/D converter.

According to this preferred aspect of the present invention, the digital data producing system further comprises at least one laser stimulating ray source for emitting a laser beam, a sample stage on which a sample carrier holding at least one sample containing a labeling substance is to be placed, scanning means for moving the sample stage so that the sample placed on the sample stage can be scanned with the laser beam emitted from the at least one laser stimulating ray source, a light detector for photoelectrically detecting light released from the labeling substance contained in the sample upon being scanned with the laser beam emitted from the at least one laser stimulating ray source and excited thereby and producing analog data, and an A/D converter for digitizing the analog data produced by the light detector to produce digital data, and the data file name assigning means is constituted so as to add a designation indicating wavelength of the laser beam scanning the sample to the basic data file name entered through the input means or a data file name created by adding a member of the set of additional character strings to the basic data file name entered through the input means to create a final data file name and assign the final data file name to the set of digital data produced by the A/D converter and, therefore, the final data file name is created by adding the designation indicating wavelength of the laser beam used for scanning the sample to the basic data file name or the data file name created by adding a member of the set of additional character strings to the basic data file name and is assigned to the set of produced digital data. As a result, sets of digital data saved in the data saving means can be easily retrieved.

In a further preferred aspect of the present invention, the set of digital data assigned the final data file name created by adding the designation indicating wavelength of the laser beam used for scanning the sample to the basic data file name entered through the input means or the data file name created by adding a member of the set of additional character strings to the basic data file name entered through the input means is saved in a data saving region having a data region name associated with the basic file name entered through the input means or the data file name created by adding a member of the set of additional character strings to the basic data file name entered through the input means.

According to this preferred aspect of the present invention, the set of digital data assigned the final data file name created by adding the designation indicating wavelength of the laser beam used for scanning the sample to the basic data file name entered through the input means or the data file name created by adding a member of the set of additional character strings to the basic data file name entered through the input means is saved in a data saving region having a data region name associated with the basic file name entered through the input means or the data file name created by adding a member of the set of additional character strings to the basic data file name entered through the input means and, therefore, sets of digital data saved in the data saving means can be easily retrieved.

In a further preferred aspect of the present invention, the digital data producing system comprises two or more laser stimulating ray sources for emitting laser beams having different wavelengths.

In a further preferred aspect of the present invention, the data file name assigning means is constituted so as to assign data file names that differ only in the designations indicating wavelengths of the laser beams to the sets of produced digital data when the same sample is scanned with the laser beams having different wavelengths.

According to this preferred aspect of the present invention, since the data file name assigning means is constituted so as to assign data file names that differ only in the designations indicating wavelengths of the laser beams to the sets of produced digital data when the same sample is scanned with the laser beams having different wavelengths from each other, sets of digital data saved in the data saving means can be easily retrieved.

In a further preferred aspect of the present invention, the sample carrier is constituted so as to carry a plurality of the samples and the number of members in the set of additional character strings in a unit of repetition is set equal to the number of the samples to be carried by the sample carrier.

According to this preferred aspect of the present invention, since the sample carrier is constituted so as to carry a plurality of the samples and the number of members in the set of additional character strings in a unit of repetition is set equal to the number of the samples to be carried by the sample carrier, sets of digital data saved in the data saving means can be easily retrieved.

In a further preferred aspect of the present invention, the sample is constituted as a micro-array in which a plurality of spots selectively labeled with a fluorescent dye are formed on a slide glass plate.

The above and other objects and features of the present invention will become apparent from the following description made with reference to the accompanying drawings.

DESCRIPTION OF THE PREFERRED EMBODIMENT

Figure 1:
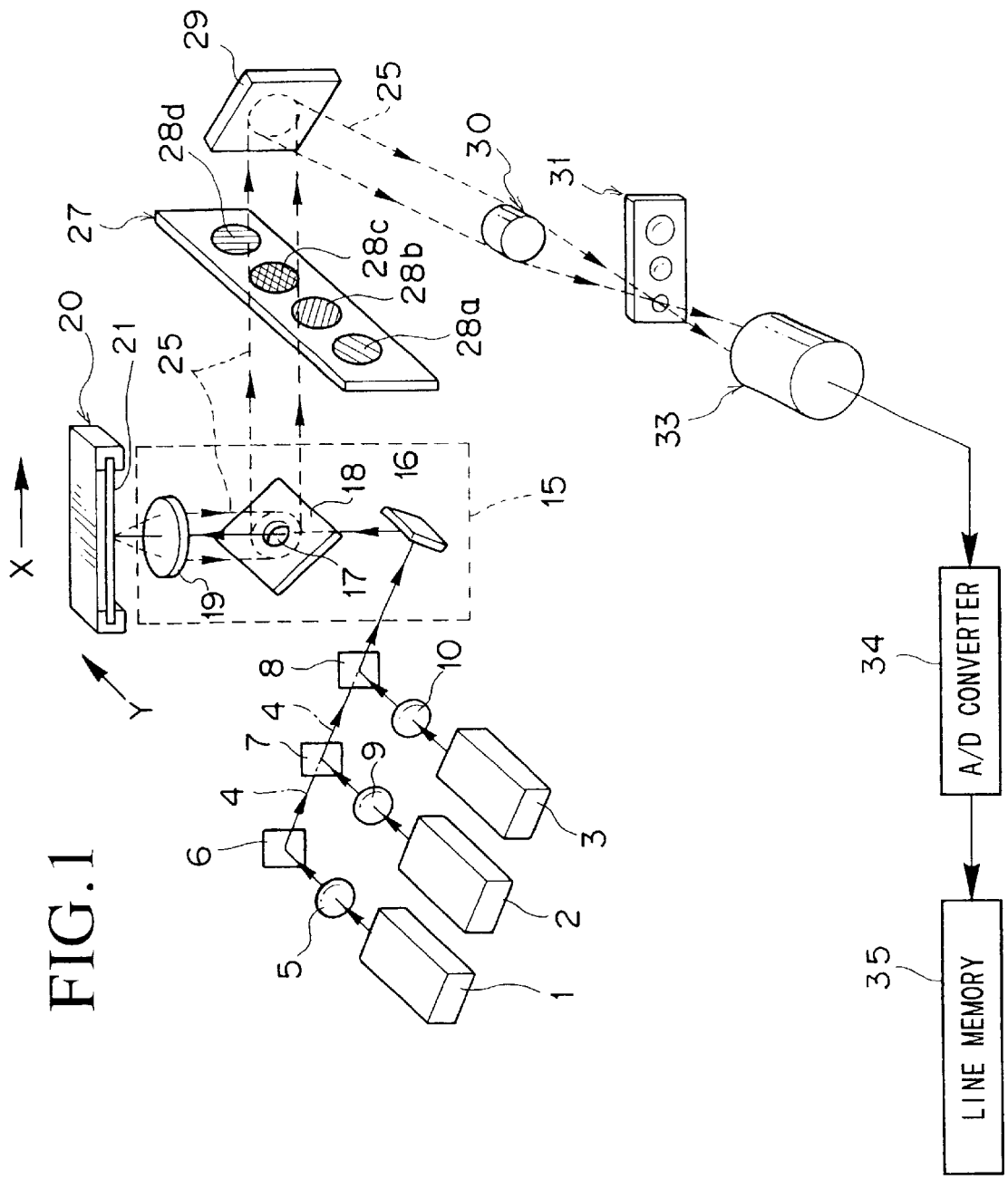
FIG. 1 is a schematic perspective view showing an image reading apparatus of a digital image data producing system which is a preferred embodiment of the present invention.

FIG. 1 is a schematic perspective view showing an image reading apparatus of a digital image data producing system which is a preferred embodiment of the present invention.

As shown in FIG. 1, an image reading apparatus of a digital image producing system according to this embodiment includes a first laser stimulating ray source 1 for emitting a laser beam having a wavelength of 640 nm, a second laser stimulating ray source 2 for emitting a laser beam having a wavelength of 532 nm and a third laser stimulating ray source 3 for emitting a laser beam having a wavelength of 473 nm. In this embodiment, the first laser stimulating ray source 1 constituted by a semiconductor laser beam source and the second laser stimulating ray source 2 and the third laser stimulating ray source 3 are constituted by a second harmonic generation element.

A laser beam 4 emitted from the first laser stimulating source 1 passes through a collimator lens 5, thereby being made a parallel beam, and is reflected by a mirror 6. A first dichroic mirror 7 for transmitting light having a wavelength of 640 nm but reflecting light having a wavelength of 532 nm and a second dichroic mirror 8 for transmitting light having a wavelength equal to and longer than 532 nm but reflecting light having a wavelength of 473 nm are provided in an optical path of the laser beam 4 emitted from the first laser stimulating source 1 and reflected by the mirror 6. The laser beam 4 emitted from the first laser stimulating ray source 1 passes through the first dichroic mirror 7 and the second dichroic mirror 8 and enters an optical unit 15.

On the other hand, the laser beam 4 emitted from the second laser stimulating ray source 2 passes through a collimator lens 9, thereby being made a parallel beam, and is reflected by the first dichroic mirror 6, thereby changing its direction by 90 degrees. The laser beam 4 then passes through the second dichroic mirror 8 and enters the optical unit 15.

Further, the laser beam 4 emitted from the third laser stimulating ray source 3 passes through a collimator lens 10, thereby being made a parallel beam, and is reflected by the second dichroic mirror 8, thereby changing its direction by 90 degrees.

The optical unit 15 includes a mirror 16, a perforated mirror 18 whose center portion is formed with a hole 17 and a lens 19. The laser beam 4 entering the optical unit 15 is reflected by the mirror 16 and passes through the hole 17 formed in the perforated mirror 18 and the lens 19, thereby entering a sample carrier 21 set on a sample stage 20. The sample stage 20 is constituted so as to be movable by a scanning mechanism (not shown) in the X direction and the Y direction in FIG. 1.

The image reading apparatus of the digital image data producing system according to this embodiment is constituted so as to produce image data for biochemical analysis by scanning a micro-array including a slide glass plate on which a number of spots of a specimen selectively labeled with a fluorescent dye are formed as a substrate with a laser beam 4 to stimulate the fluorescent dye and photoelectrically detecting fluorescence emission released from the fluorescent dye and to also produce image data for biochemical analysis by scanning a fluorescence sample including a transfer support containing denatured DNA fragments selectively labeled with a fluorescent dye as a substrate with a laser beam 4 to stimulate the fluorescent dye and photoelectrically detecting fluorescence emission released from the fluorescent dye. The image reading apparatus according to this embodiment is further constituted so as to produce image data for biochemical analysis by scanning a stimulable phosphor layer of a stimulable phosphor sheet in which locational information of a radioactive labeling substance are recorded by closely contacting a substrate such as a membrane filter having a number of spots of a specimen selectively labeled with a radioactive labeling substance and the stimulable phosphor sheet formed with the stimulable phosphor layer containing a stimulable phosphor to expose the stimulable phosphor layer with the radioactive labeling substance with a laser beam 4 to excite the stimulable phosphor and photoelectrically detecting stimulated emission released from the stimulable phosphor.

A micro-array is prepared in the following manner, for example.

First, a specimen solution containing different cDNA probes is spot-like dropped onto the slide glass plate, whereby a plurality of spots containing different cDNA probes are formed on the slide glass plate.

On the other hand, a specimen of RNA is extracted from biological cells, and mRNA having poly A at 3' terminal is extracted from the RNA. Then, cDNA is synthesized from the thus extracted mRNA having poly A at 3' terminal in the presence of a labeling substance, Cy3 (registered trademark), to prepare first target DNA labeled with Cy3.

Further, a specimen of RNA is extracted from biological cells, and mRNA having poly A at 3' terminal is extracted from the RNA. Then, cDNA is synthesized from the thus extracted mRNA having poly A at 3' terminal in the presence of a labeling substance, Cy5 (registered trademark), to prepare second target DNA labeled with Cy5.

The thus prepared first target DNA and second target DNA are mixed and the thus mixed solution is gently loaded onto the surface of the slide glass plate 23 on which cDNAs, specific binding substances, are spotted, and then hybridization is performed.

On the other hand, an electrophoresis image of denatured DNA fragments labeled with a fluorescent dye is recorded in a transfer support in the following manner, for example.

First, a plurality of DNA fragments containing a specific gene are separated and distributed on a gel support medium by means of electrophoresis and are denatured by alkali processing to form single-stranded DNA.

Then, according to the known Southern blotting method, the gel support and a transfer support are stacked to transfer at least a part of the denatured DNA fragments onto the transfer support and the transferred DNA fragments are fixed on the transfer support by heating and irradiating with an ultraviolet ray.

Further, probes prepared by labeling DNA or RNA with fluorescent dye, which is complementary to the DNA containing the specific gene, and the denatured DNA fragments on the transfer support are hybridized by heating to form double-stranded DNA fragments or combined DNA and RNA. Then, DNA or RNA which is complementary to the DNA containing DNA of the specific gene is labeled with a fluorescent dye such as Fluorescein, Rhodamine or Cy5 to prepare the probes. Since the denatured DNA fragments are fixed on the transfer support at this time, only the DNA fragments which are complimentary to the probe DNA or probe RNA are hybridized to acquire the fluorescently labeled probe. Then, the probes which have not formed hybrids are removed by washing with a proper solution and only the DNA fragments having a specific gene form hybrids with the fluorescently labeled DNA or RNA on the transfer support to be fluorescently labeled. The thus obtained transfer support records an electrophoresis image of the denatured DNA labeled with fluorescent dye.

Further, locational information regarding a radioactively labeling substance is recorded in a stimulable phosphor layer formed on the stimulable sheet in following manner, for example.

The surface of a substrate such as a membrane filter is pretreated and then cDNAs which are specific binding substances, each of which has a known base sequence and is different from the others, are spotted onto predetermined positions on the surface of the substrate such as a membrane filter using a spotter device.

On the other hand, a specimen of RNA is extracted from biological cells, and mRNA having poly A at 3' terminal is extracted from the RNA. Then, cDNA is synthesized from the thus extracted mRNA having poly A at 3' terminal in the presence of a radioactive labeling substance to prepare probe DNA labeled with the radioactive labeling substance.

A solution of the thus obtained probe DNA labeled with the radioactive labeling substance is prepared, and is gently loaded onto the surface of the substrate such as a membrane filter on which cDNAs, specific binding substances, are spotted, and then hybridization is performed.

A stimulable phosphor layer formed on a stimulable phosphor sheet is then superimposed on the surface of the substrate such as a membrane filter containing a hybridized specimen and they are held for a certain period of time, whereby at least a part of radiation released from the radioactive labeling substance on the substrate such as a membrane filter is absorbed in the stimulable phosphor layer formed on the stimulable phosphor sheet and locational information of the radioactive labeling substance is recorded in the stimulable phosphor layer.

When the laser beam 4 is impinged on the sample 22 from the optical unit 15, a fluorescent substance is excited by the laser beam 4 to release fluorescence emission in the case where the sample 22 is a micro-array or a fluorescence sample. On the other hand, in the case where the sample 22 is a stimulable phosphor sheet, stimulable phosphors contained in the stimulable phosphor sheet are excited by the laser beam 4 to release stimulated emission.

The fluorescence emission or the stimulated emission 25 released from the sample 22 is made into a parallel beam by the lens 19 of the optical unit 15 and reflected by the perforated mirror 18, thereby entering one of four filters 28a, 28b, 28c and 28d of a filter unit 27.

The filter unit 27 is constituted to be laterally movable in FIG. 1 by a motor (not shown) so that a predetermined one of the filters 28a, 28b, 28c and 28d is located in the optical path of the fluorescence emission or the stimulated emission 25 depending upon the kind of the laser stimulating ray source to be used.

The filter 28a is used for reading fluorescence emission released from fluorescent substance contained in the sample 22 upon being excited using the first laser stimulating ray source 1 and has a property to cut off light having a wavelength of 640 nm but transmit light having a wavelength longer than 640 nm.

The filter 28b is used for reading fluorescence emission released from fluorescent substance contained in the sample 22 upon being excited using the second laser stimulating ray source 2 and has a property to cut off light having a wavelength of 532 nm but transmit light having a wavelength longer than 532 nm.

The filter 28c is used for reading fluorescence emission released from fluorescent substance contained in the sample 22 upon being excited using the third laser stimulating ray source 3 and has a property to cut off light having a wavelength of 473 nm but transmit light having a wavelength longer than 473 nm.

The filter 28d is used in the case where the sample 22 is a stimulable phosphor sheet for reading stimulated emission released from stimulable phosphor contained in the stimulable phosphor sheet upon being excited using the first laser stimulating ray source 1 and has a property to transmit only light having a wavelength associated with that of stimulated emission emitted from stimulable phosphor but cut off light having a wavelength of 640 nm.

Therefore, in accordance with the kind of a stimulating ray source to be used, namely, depending upon whether the image to be read is a fluorescent image or an image regarding locational information of a radioactively labeling substance and the kind of fluorescent substance labeling a specimen, one of these filters 28a, 28b, 28c, 28d is selectively used, thereby cutting light of wavelengths which cause noise.

After fluorescence emission or stimulated emission 25 passes through one of the filters 28a, 28b, 28c, 28d, whereby light of a predetermined wavelength region is cut, the fluorescence emission or the stimulated emission 25 advances to a mirror 29 and is reflected thereby to be condensed by a lens 30.

The lens 19 and the lens 30 constitute a confocal optical system. The reason for employing a confocal optical system is to enable fluorescence emission emitted from a minute spot formed on a slide glass plate to be read with a high S/N ratio when the sample 22 is a micro-array including the slide glass plate 23 as a substrate.

A confocal switching member 31 is provided at the focal point of the lens 30.

Figure 2:
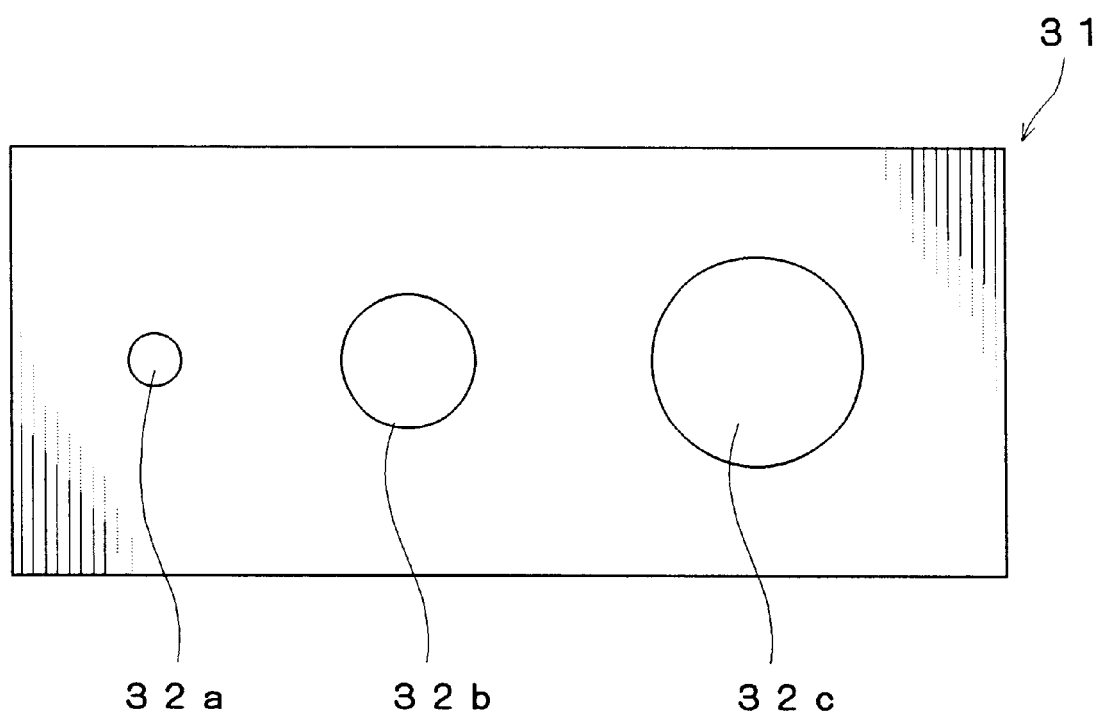
FIG. 2 is a schematic front view showing a confocal switching member.

FIG. 2 is a schematic front view showing the confocal switching member 31.

As shown in FIG. 2, the confocal switching member 31 is formed plate-like and with three pinholes 32a, 32b, 32c.

The pinhole 32a having the smallest diameter is located in a light path of fluorescence emission emitted from the micro-array when the sample is a micro-array including a slide glass plate as a substrate and the pinhole 32c having the largest diameter is located in a light path of fluorescence emission emitted from a transfer support when the sample is a fluorescence sample including a transfer support as a substrate.

Further, the pinhole 32b having an intermediate diameter is located in a light path of a stimulated emission released from a stimulable phosphor layer when the sample is a stimulable phosphor sheet.

In this manner, the confocal switching member 31 is provided at the focal point of the lens 30 and the pinhole 32a having the smallest diameter is located in the light path of fluorescence emission when the sample 22 is a micro-array including a slide glass plate as a substrate. This is because when the sample 22 is a micro-array including a slide glass plate 23 as a substrate, fluorescence emission is emitted from the surface of the slide glass plate when the fluorescent dye is excited with the laser beam 4 and the depth of the light emitting points in the slide glass plate is substantially constant, so that it is preferable to use a confocal optical system to focus an image on the pinhole 32a having the smallest diameter for improving the S/N ratio.

On the other hand, the pinhole 32c is located in the light path of fluorescence emission when the sample 22 is a fluorescence sample including a transfer support as a substrate. This is because when the sample 22 is a fluorescence sample including a transfer support as a substrate, the positions of the light emitting points fluctuate in the depth direction when the fluorescent dye is excited with the laser beam 4 because the fluorescent substance is distributed in the depth direction of the transfer support, so that it is impossible to focus an image on a pinhole having a small diameter even when a confocal optical system is used, and a fluorescent light emitted from the specimen is cut if a pinhole having a small diameter is used, whereby signals having a sufficient intensity cannot be obtained and, therefore, it is necessary to use the pinhole 32c having the largest diameter.

Further, in the case where the sample 22 is a stimulable phosphor sheet, the pinhole 32b having an intermediate diameter is located in a light path of a stimulated emission. This is because when the sample 22 is a stimulable phosphor sheet, the positions of the light emitting points fluctuate in the depth direction when a stimulable phosphor contained in the stimulable phosphor layer is excited with the laser beam 4 because the light emitting points of a stimulated emission are distributed in the depth direction of the stimulable phosphor layer, so that it is impossible to focus an image on a pinhole having a small diameter even when a confocal optical system is used, and the stimulated emission emitted from the specimen is cut if a pinhole having a small diameter is used, whereby signals having a sufficient intensity cannot be obtained by photoelectrically detecting the stimulated emission but the distribution of the light emitting points in the depth direction and the fluctuation in positions of the light emitting points in the depth direction are no so great as those for reading a fluorescent image carried in the transfer support or the gel support and, therefore, it is preferable to employ the pinhole 32b having an intermediate diameter.

The fluorescence emission or stimulated emission 25 passing through the confocal switching member 31 is photoelectrically detected by a photomultiplier 33, thereby producing analog data.

The analog image data produced by the photomultiplier 33 are converted by an A/D converter 34 into digital image data and the digital image data are forwarded to a line memory 35.

Figure 3:
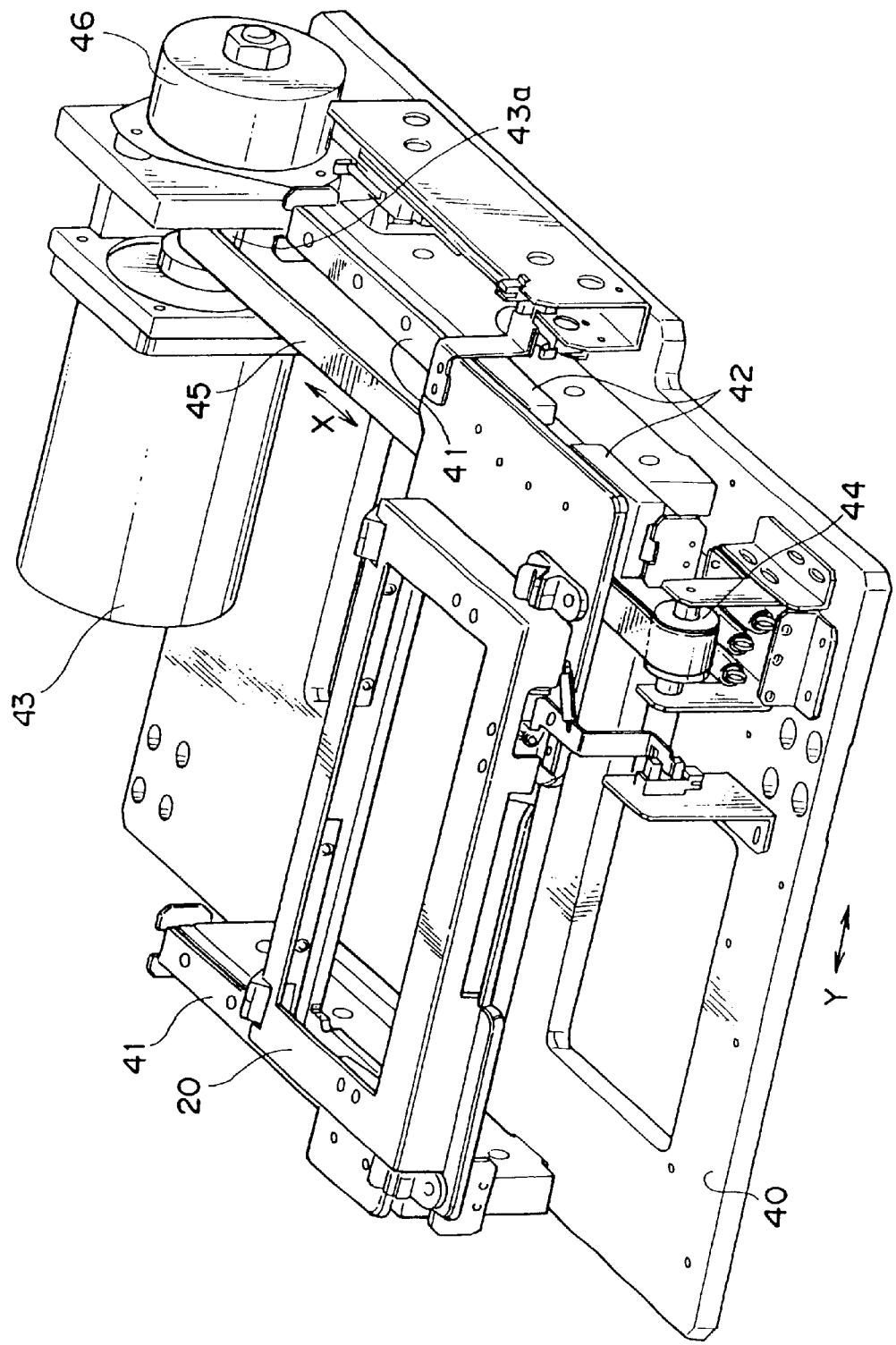
FIG. 3 is a schematic perspective view showing the details of a main scanning mechanism that is part of a scanning mechanism of a sample stage.

FIG. 3 is a schematic perspective view showing the details of a main scanning mechanism that is part of a scanning mechanism of a sample stage.

Figure 4:
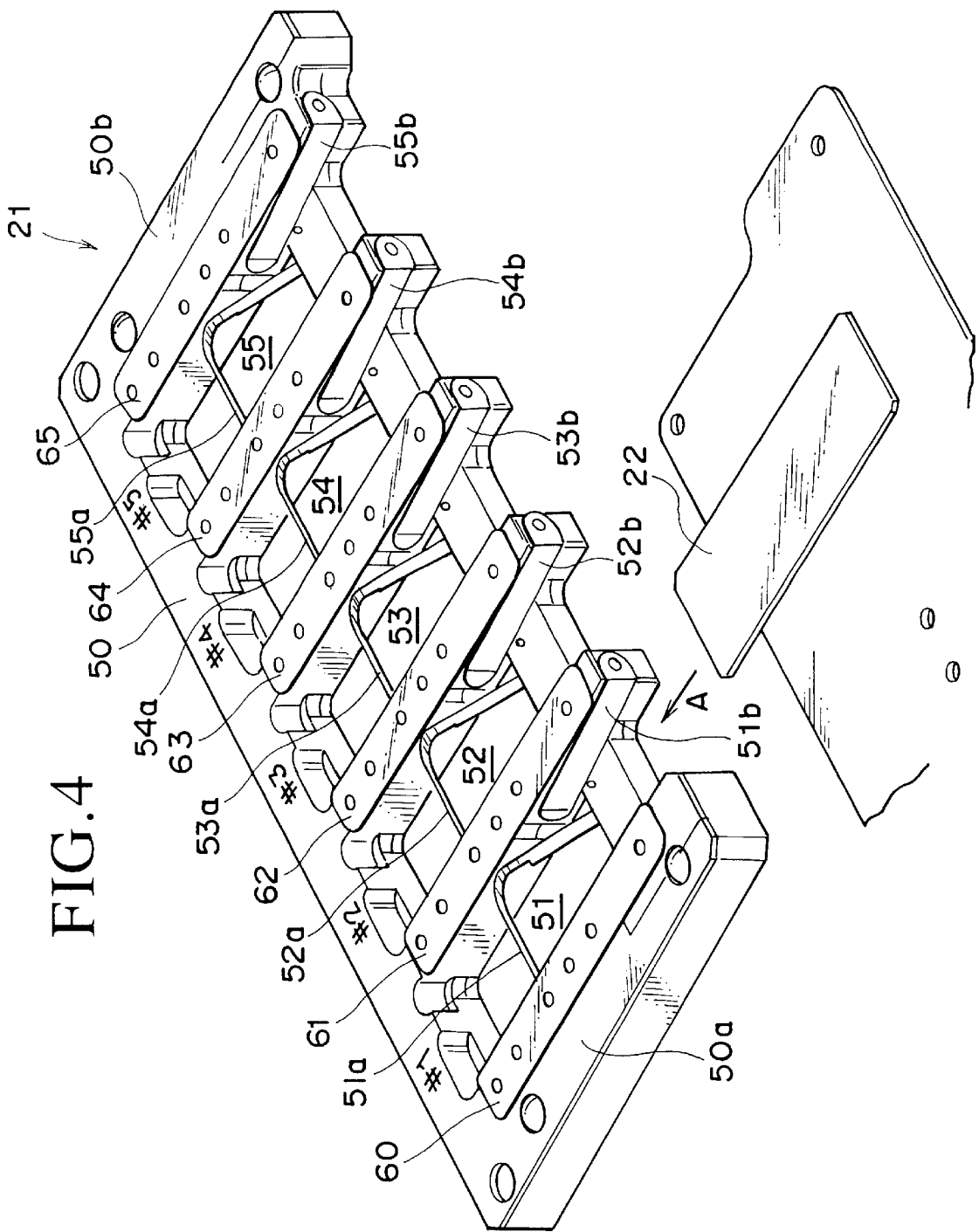
FIG. 4 is a schematic perspective view showing a sample carrier to be set on a sample stage of an image reading apparatus of a digital image data producing system which is a preferred embodiment of the present invention.

As shown in FIG. 3, a pair of guide rails 41, 41 are fixed on the movable base plate 40 movable in a sub-scanning direction indicated by the arrow Y in FIG. 4 by a sub-scanning motor (not shown) and the sample stage 20 is fixed to three side members 42, 42 (only two shown in FIG. 3) slidably mounted on the pair of guide rails 41, 41.

As shown in FIG. 3, a main scanning motor 43 is fixed on the movable base plate 40. A timing belt 45 wound around a pulley 44 is wound around the output shaft 43a of the main scanning motor 43 and a rotary encoder 46 is secured to the output shaft 43a of the main scanning motor 43.

Therefore, the sample stage 20 can be reciprocated along the pair of guide rails 41, 41 in the main scanning direction indicated by the arrow X in FIG. 3 by driving the main scanning motor 43 and the sample stage 20 can be two-dimensionally moved by further moving the movable base plate 40 in the sub-scanning direction by the sub-scanning motor (not shown), thereby enabling the whole surface of the sample 22 set on the sample stage 20 to be scanned with the laser beam 4.

The position of the sample stage 20 can be monitored by the rotary encoder 46.

FIG. 4 is a schematic perspective view showing the sample carrier 21 to be set on the sample stage 20 of an image reading apparatus of a digital image data producing system which is a preferred embodiment of the present invention and in FIG. 4, the sample carrier 21 is viewed from the backside, namely, from the side thereof to be placed on the sample stage 20.

As shown in FIG. 4, the sample carrier 21 includes a frame member 50 formed by processing a single plate member and the frame member 50 is formed with five openings into which the sample 22 can be set, namely, a first opening 51, a second opening 52, a third opening 53, a fourth opening 54 and a fifth opening 55.

Rectangular plate members 60, 61, 62, 63, 64, 65 are respectively mounted on the surface of the frame member 50 so that portions thereof on the side of the first opening 51, the second opening 52, the third opening 53, the fourth opening 54 and the fifth opening 55 are located along the longitudinal directions of the first opening 51, the second opening 52, the third opening 53, the fourth opening 54 and the fifth opening 55 and project above the first opening 51, the second opening 52, the third opening 53, the fourth opening 54 and the fifth opening 55.

As shown in FIG. 4, L-shaped leaf springs 51a, 52a, 53a, 54a, 55a are respectively mounted in the first opening 51, the second opening 52, the third opening 53, the fourth opening 54 and the fifth opening 55 so as to produce a spring force thereof toward the rear side of the sample carrier 21. Leaf springs 51b, 52b, 53b, 54b, 55b are further mounted on the inner wall portions of the first opening 51, the second opening 52, the third opening 53, the fourth opening 54 and the fifth opening 55 respectively for aligning the sample set in the first opening 51, the second opening 52, the third opening 53, the fourth opening 54 and the fifth opening 55 along opposite inner wall portions.

The sample carrier 21 is constituted to be set on the sample stage 20 so that the opposite side portions 50a, 50b of the frame member 50 are placed on the sample stage 20.

When micro-arrays, the samples 22, each including a slide glass plate as a substrate are to be set in the sample carrier 21, the samples 22 are inserted into the first opening 51, the second opening 52, the third opening 53, the fourth opening 54 and the fifth opening 55 in the direction indicated by the arrow A in FIG. 4.

Since the leaf springs 51b, 52b, 53b, 54b, 55b are further mounted on the inner wall portions of the first opening 51, the second opening 52, the third opening 53, the fourth opening 54 and the fifth opening 55 respectively, the samples 22 are aligned along the opposite inner wall portions in the first opening 51, the second opening 52, the third opening 53, the fourth opening 54 and the fifth opening 55.

At the same time, the bend portions of the L-shaped leaf springs 51a, 52a, 53a, 54a, 55a abut against the samples 22 inserted in the first opening 51, the second opening 52, the third opening 53, the fourth opening 54 and the fifth opening 55 and the samples 22 are biased by the spring force of the leaf springs 51a, 52a, 53a, 54a, 55a onto the surfaces of the plate members 60, 61, 62, 63, 64, 65 mounted so that portions thereof on the side of the first opening 51, the second opening 52, the third opening 53, the fourth opening 54 and the fifth opening 55 are located along the longitudinal directions of the first opening 51, the second opening 52, the third opening 53, the fourth opening 54 and the fifth opening 55 and project above the first opening 51, the second opening 52, the third opening 53, the fourth opening 54 and the fifth opening 55, thereby being held in the sample carrier 21.

In the sample carrier 21 shown in FIG. 4, the plate members 60, 61, 62, 63, 64, 65 are mounted on the surface of the frame member 50 so that portions thereof on the side of the first opening 51, the second opening 52, the third opening 53, the fourth opening 54 and the fifth opening 55 are located along the longitudinal directions of the first opening 51, the second opening 52, the third opening 53, the fourth opening 54 and the fifth opening 55 and project above the first opening 51, the second opening 52, the third opening 53, the fourth opening 54 and the fifth opening 55 and the samples 22 are biased by the spring force of the leaf springs 51a, 52a, 53a, 54a, 55a onto the surfaces of the plate members 60, 61, 62, 63, 64, 65, thereby being held in the sample carrier 21.

On the other hand, the sample carrier 21 is set on the sample stage 20 so that the opposite side portions 50a, 50b of the frame member 50 formed by processing a single plate member are placed on the sample stage 20.

Therefore, since the surfaces of the plate members 60, 61, 62, 63, 64, 65 on which the samples 22 are supported and the surface of the sample stage 20 on which the sample carrier 21 is supported are always located in the same plane, five samples 22 can be set on the sample stage 20 with a constant positional relationship between themselves and the sample stage 20 without need for troublesome adjustment of the position of the sample carrier 21.

Further, since five samples 22 can be set on the sample stage 20 with a constant positional relationship between themselves and the sample stage 20 merely by mounting the plate members 60, 61, 62, 63, 64, 65 on the surface of the frame member 50 formed by processing a single plate member, the cost of the sample carrier 21 can be markedly reduced.

Figure 5:
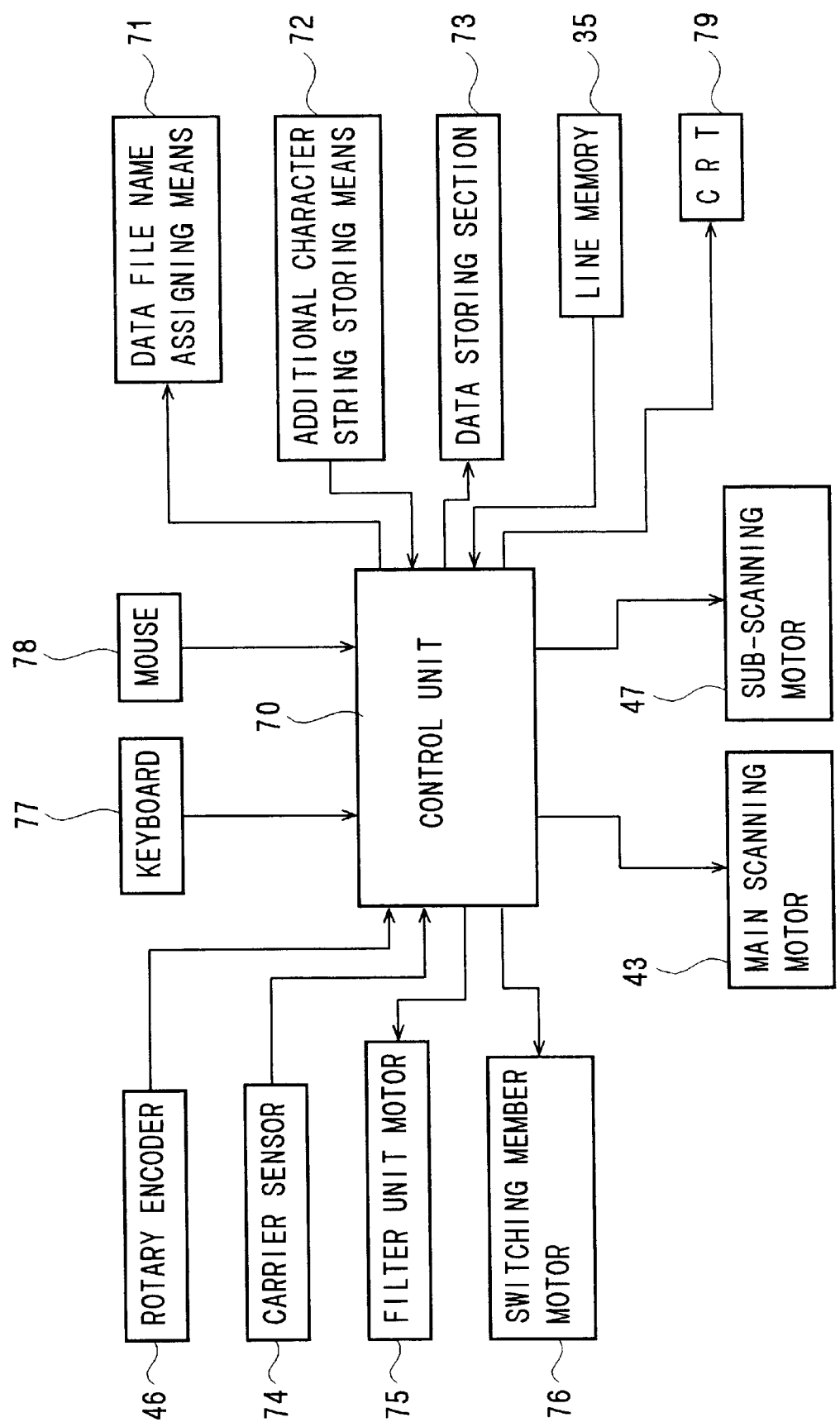
FIG. 5 is a block diagram of a control system, a detection system, a drive system, an input system and a display system of an image reading apparatus of a digital image data producing system which is a preferred embodiment of the present invention.

FIG. 5 is a block diagram of a control system, a detection system, a drive system, an input system and a display system of the image reading apparatus of the digital image data producing system which is a preferred embodiment of the present invention.

As shown in FIG. 5, the control system of the image reading apparatus of the digital image data producing system according to this embodiment includes a control unit 70 for controlling the overall operation of the digital image data producing system, data file name assigning means 71 for assigning data file names to sets of digital image data, additional character string storing means 72 for storing data file names to be assigned to sets of digital image data and a data storing section 73 for storing sets of digital data to which data file names are assigned.

As shown in FIG. 5, the detection system of the image reading apparatus includes a rotary encoder 46 and a carrier sensor 74 for detecting the kind of a sample carrier 21 carrying the sample 22 set on the sample stage.

As shown in FIG. 5, the drive system of the image reading apparatus includes a filter unit motor 75 for moving the filter unit, a switching member motor 76 for moving the confocal switching member 31, the main scanning motor 43 for reciprocating the sample stage 20 in the main scanning direction and a sub-scanning motor 47 for intermittently moving the sample stage 20 in the sub-scanning direction.

As shown in FIG. 5, the input system of the image reading apparatus includes a keyboard 77 and a mouse 78 and the display system of the image reading apparatus includes a CRT 79.

The thus constituted image reading apparatus of the digital image data producing system according to this embodiment produces image data for biochemical analysis by scanning a micro-array including a slide glass plate on which a number of spots of a specimen selectively labeled with a fluorescent dye are formed as a substrate with a laser beam 4 to stimulate the fluorescent dye and photoelectrically detecting fluorescence emission released from the fluorescent dye in the following manner.

Five micro-arrays, which are samples 22 and include a slide glass plate as a substrate, are inserted into the first opening 51, the second opening 52, the third opening 53, the fourth opening 54 and the fifth opening 55 in the direction indicated by the arrow A in FIG. 4.

Since the leaf springs 51b, 52b, 53b, 54b, 55b are further mounted on the inner wall portions of the first opening 51, the second opening 52, the third opening 53, the fourth opening 54 and the fifth opening 55 respectively, the samples 22 are aligned along the opposite inner wall portions in the first opening 51, the second opening 52, the third opening 53, the fourth opening 54 and the fifth opening 55.

At the same time, the bend portions of the L-shaped leaf springs 51a, 52a, 53a, 54a, 55a abut against the samples 22 inserted in the first opening 51, the second opening 52, the third opening 53, the fourth opening 54 and the fifth opening 55 and the samples 22 are biased by the spring force of the leaf springs 51a, 52a, 53a, 54a, 55a onto the surfaces of the plate members 60, 61, 62, 63, 64, 65 mounted so that portions thereof on the side of the first opening 51, the second opening 52, the third opening 53, the fourth opening 54 and the fifth opening 55 are located along the longitudinal directions of the first opening 51, the second opening 52, the third opening 53, the fourth opening 54 and the fifth opening 55 and project above the first opening 51, the second opening 52, the third opening 53, the fourth opening 54 and the fifth opening 55, thereby being held in the sample carrier 21.

In this embodiment, the plate members 60, 61, 62, 63, 64, 65 are mounted on the surface of the frame member 50 so that portions thereof on the side of the first opening 51, the second opening 52, the third opening 53, the fourth opening 54 and the fifth opening 55 are located along the longitudinal directions of the first opening 51, the second opening 52, the third opening 53, the fourth opening 54 and the fifth opening 55 and project above the first opening 51, the second opening 52, the third opening 53, the fourth opening 54 and the fifth opening 55 and the samples 22 are biased by the spring force of the leaf springs 51a, 52a, 53a, 54a, 55a onto the surfaces of the plate members 60, 61, 62, 63, 64, 65, thereby being held in the sample carrier 21. On the other hand, the sample carrier 21 is set on the sample stage 20 so that the opposite side portions 50a, 50b of the frame member 50 formed by processing a single plate member rest on the sample stage 20. Therefore, since the surfaces of the plate members 60, 61, 62, 63, 64, 65 on which the samples 22 are supported and the surface of the sample stage 20 on which the sample carrier 21 is supported are always located in the same plane, five samples 22 can be set on the sample stage 20 with a constant positional relationship between themselves and the sample stage 20 without need for troublesome adjustment of the position of the sample carrier 21.

When the sample carrier 21 carrying the five micro-arrays, which are samples 22 and a slide glass plate as a substrate, is set on the sample stage 20, the kind of the sample carrier 21 is detected by the carrier sensor 74 and a carrier detection signal is output to the control unit 70.

When the control unit 70 receives the carrier detection signal from the carrier sensor 74, it outputs a drive signal to the switching member motor 76 based on the carrier detection signal and causes it to move the confocal switching member 31 so that the pinhole 32a having the smallest diameter is located in the optical path.

The kind of a labeling substance, a fluorescent dye is further input by the user through the keyboard 77 and a labeling substance specifying signal is output from the keyboard 77 to the control unit 70.

In this embodiment, the specimen is doubly labeled with two kinds of labeling substances which can be efficiently stimulated by laser beams 4 having different wavelengths from each other, for example, Cy5 (registered trademark) and Cy3 (registered trademark) and, therefore, Cy5 (registered trademark) and Cy3 (registered trademark) are input by the user as the kinds of fluorescent dyes labeling the specimen through the keyboard 77.

When the user inputs Cy5 and Cy3 as the kinds of fluorescent dyes labeling the specimen, a labeling substance specifying signal is output to the control unit 70.

When Cy5 and Cy3 are specified as the kinds of fluorescent dyes labeling the specimen, the control unit 70 first outputs a drive signal to the filter unit motor 75, thereby causing it to move the filter unit 27 so that the filter 28a having a property to cut off a light component having a wavelength of 640 nm and transmit light components having wavelengths longer than 640 nm is located in the optical path and the control unit 70 then outputs a drive signal to the first laser stimulating ray source 1 to turn it on.

The laser beam 4 emitted from the first laser stimulating ray source 1 passes through a collimator lens 5, thereby being made a parallel beam, and advances to the mirror 6 to be reflected thereby. The laser beam 4 reflected by the mirror 6 passes through the first dichroic mirror 7 and the second dichroic mirror 8 and enters the optical head 15.

The laser beam 4 entering the optical unit 15 is reflected by the mirror 16, passes through the hole 17 formed in the perforated mirror 18 and through the lens 19 to impinge on the sample 22, the micro-array set in the first opening 51 of the sample carrier 21.

Since the sample stage 20 is moved by the main scanning motor 43 in the main scanning direction indicated by the arrow X in FIG. 3 and is moved by the sub-scanning motor 47 in the sub-scanning direction indicated by the arrow Y in FIG. 3, the whole surface of the micro-array set in the first opening 51 of the sample carrier 21 is scanned with the laser beam 4.

When being irradiated with the laser beam 4, Cy5 labeling the probe DNA is stimulated by the laser beam 4, thereby releasing fluorescence emission 25. In the case where a slide glass plate is used as a substrate of the micro-array, since a fluorescent dye is distributed on only the surface of the slide glass plate, fluorescence emission 25 is released from only the surface of the slide glass plate.

The fluorescence emission 25 released from the slide glass plate passes through the lens 19, thereby being made a parallel beam, and is reflected by the perforated mirror 18, thereby entering the filter unit 27.

Since the filter unit 27 has been moved so that the filter 28a is located in the optical path, the fluorescence emission enters the filter 28a, thereby cutting light having a wavelength of 640 nm and transmitting only light having a wavelength longer than 640 nm.

The fluorescence emission transmitted through the filter 28a is reflected by the mirror 29 and focused by the lens 30.

Since the confocal switching member 31 has been moved prior to the irradiation with the laser beam 4 so that the pinhole 32a having the smallest diameter is located in the optical path, the fluorescence emission 25 is focused onto the pinhole 32a and is photoelectrically detected by the photomultiplier 33 thereby producing analog data.

Fluorescence emission 25 released from a fluorescent dye on the surface of the slide glass plate is led to the photomultiplier 33 using a confocal optical system to be photoelectrically detected in this manner and, therefore, noise in the data can be minimized.

The analog data produced by the photomultiplier 33 are converted to a digital data by the A/D converter 34 and the digital data are stored in the line memory 35.

In this manner, the sample stage 20 is reciprocated by the main scanning motor 43 in the main scanning direction and is moved by the sub-scanning motor 47 in the sub-scanning direction and the whole surface of the micro-array in which a number of spots of the specimen selectively labeled with Cy5 on the slide glass plate and which is set in the first opening 51 of the sample carrier 21 is scanned with the laser beam 4 having a wavelength of 640 nm to stimulate Cy5. The fluorescence emission 25 released from Cy5 upon being scanned with the laser beam 4 is photoelectrically detected by the photomultiplier 33 to produce analog data and the analog data are digitized by the A/D converter 34 to produce digital data. Thus, when digital data of the sample have been stored in the line memory 35, the production of digital image data of the specimen labeled with Cy5 and contained in the micro-array set in the first opening 51 is completed.

When the digital image data of the specimen labeled with Cy5 and contained in the micro-array set in the first opening 51 have been stored in the line memory 35 in this manner, the control unit 70 further starts the production of digital image data of the specimen labeled with Cy3 and contained in the micro-array set in the first opening 51.

Specifically, the control unit 70 outputs a drive signal to the filter unit motor 75 in accordance with a labeling substance specifying signal, thereby causing it to move the filter unit 27 so that the filter 28c having a property to cut off a light component having a wavelength of 473 nm and transmit light components having wavelengths longer than 473 nm is located in the optical path and the control unit 70 then outputs a drive signal to the third laser stimulating ray source 3, thereby turning it on.

The laser beam 4 emitted from the third laser stimulating ray source 3 is reflected by the second dichroic mirror 8 to enter the optical head 15.

The laser beam 4 entering the optical unit 15 is reflected by the mirror 16, passes through the hole 17 formed in the perforated mirror 18 and through the lens 19 to impinge on the sample 22, the micro-array set in the first opening 51 of the sample carrier 21.

Since the sample stage 20 is moved by the main scanning motor 43 in the main scanning direction indicated by the arrow X in FIG. 3 and is moved by the sub-scanning motor 47 in the sub-scanning direction indicated by the arrow Y in FIG. 3, the whole surface of the micro-array set in the first opening 51 of the sample carrier 21 is scanned with the laser beam 4.

When being irradiated with the laser beam 4, Cy3 labeling the probe DNA is stimulated by the laser beam 4, thereby releasing fluorescence emission 25. In the case where a slide glass plate is used as a substrate of the micro-array, since a fluorescent dye is distributed on only the surface of the slide glass plate, fluorescence emission 25 is released from only the surface of the slide glass plate.

The fluorescence emission 25 released from the slide glass plate passes through the lens 19, thereby being made a parallel beam, and is reflected by the perforated mirror 18, thereby entering the filter unit 27.

Since the filter unit 27 has been moved so that the filter 28c is located in the optical path, the fluorescence emission enters the filter 28c, thereby cutting light having a wavelength of 473 nm and transmitting only light having a wavelength longer than 473 nm.

The fluorescence emission transmitted through the filter 28c is reflected by the mirror 29 and focused by the lens 30.

Since the confocal switching member 31 has been moved prior to the irradiation with the laser beam 4 so that the pinhole 32a having the smallest diameter is located in the optical path, the fluorescence emission 25 is focused onto the pinhole 32a and is photoelectrically detected by the photomultiplier 33 thereby producing analog data.

Fluorescence emission 25 released from a fluorescent dye on the surface of the slide glass plate is led to the photomultiplier 33 using a confocal optical system to be photoelectrically detected in this manner and, therefore, noise in the data can be minimized.

The analog data produced by the photomultiplier 33 are converted to a digital data by the A/D converter 34 and the digital data are stored in the line memory 35.

In this manner, the sample stage 20 is reciprocated by the main scanning motor 43 in the main scanning direction and is moved by the sub-scanning motor 47 in the sub-scanning direction and the whole surface of the micro-array in which a number of spots of the specimen selectively labeled with Cy3 on the slide glass plate and which is set in the first opening 51 of the sample carrier 21 is scanned with the laser beam 4 having a wavelength of 473 nm to stimulate Cy3. The fluorescence emission 25 released from Cy3 upon being scanned with the laser beam 4 is photoelectrically detected by the photomultiplier 33 to produce analog data and the analog data are digitized by the A/D converter 34 to produce digital data. Thus, when digital data of the sample have been stored in the line memory 35, the production of digital image data of the specimen labeled with Cy3 and contained in the micro-array set in the first opening 51 is completed.

When the digital image data of the specimen labeled with Cy3 and contained in the micro-array set in the first opening 51 have been stored in the line memory 35 in this manner, the control unit 70 further starts the production of digital image data of the specimen labeled with Cy5 and contained in the micro-array set in the second opening 52 of the sample carrier 21.

Specifically, the control unit 70 outputs a drive signal to the filter unit motor 75, thereby causing it to move the filter unit 27 so that the filter 28a having a property to cut off a light component having a wavelength of 640 nm and transmit light components having wavelengths longer than 640 nm is located in the optical path and the control unit 70 then outputs a drive signal to the first laser stimulating ray source 1, thereby turning it on.

The laser beam 4 emitted from the first laser stimulating ray source 1 passes through a collimator lens 5, thereby being made a parallel beam, and advances to the mirror 6 to be reflected thereby. The laser beam 4 reflected by the mirror 6 passes through the first dichroic mirror 7 and the second dichroic mirror 8 and enters the optical head 15.

The laser beam 4 entering the optical unit 15 is reflected by the mirror 16, passes through the hole 17 formed in the perforated mirror 18 and through the lens 19 to impinge on the sample 22, the micro-array set in the second opening 52 of the sample carrier 21.

Since the sample stage 20 is moved by the main scanning motor 43 in the main scanning direction indicated by the arrow X in FIG. 3 and is moved by the sub-scanning motor 47 in the sub-scanning direction indicated by the arrow Y in FIG. 3, the whole surface of the micro-array set in the second opening 52 of the sample carrier 21 is scanned with the laser beam 4.

When being irradiated with the laser beam 4, Cy5 labeling the probe DNA is stimulated by the laser beam 4, thereby releasing fluorescence emission 25. In the case where a slide glass plate is used as a substrate of the micro-array, since a fluorescent dye is distributed on only the surface of the slide glass plate, fluorescence emission 25 is released from only the surface of the slide glass plate.

The fluorescence emission 25 released from the slide glass plate passes through the lens 19, thereby being made a parallel beam, and is reflected by the perforated mirror 18, thereby entering the filter unit 27.

Since the filter unit 27 has been moved so that the filter 28a is located in the optical path, the fluorescence emission enters the filter 28a, thereby cutting light having a wavelength of 640 nm and transmitting only light having a wavelength longer than 640 nm.

The fluorescence emission transmitted through the filter 28a is reflected by the mirror 29 and focused by the lens 30.

Since the confocal switching member 31 has been moved prior to the irradiation with the laser beam 4 so that the pinhole 32a having the smallest diameter is located in the optical path, the fluorescence emission 25 is focused onto the pinhole 32a and is photoelectrically detected by the photomultiplier 33 thereby producing analog data.

Fluorescence emission 25 released from a fluorescent dye on the surface of the slide glass plate is led to the photomultiplier 33 using a confocal optical system to be photoelectrically detected in this manner and, therefore, noise in the data can be minimized.

The analog data produced by the photomultiplier 33 are converted to a digital data by the A/D converter 34 and the digital data are stored in the line memory 35.

In this manner, the sample stage 20 is reciprocated by the main scanning motor 43 in the main scanning direction and is moved by the sub-scanning motor 47 in the sub-scanning direction and the whole surface of the micro-array in which a number of spots of the specimen selectively labeled with Cy5 on the slide glass plate and which is set in the second opening 52 of the sample carrier 21 is scanned with the laser beam 4 having a wavelength of 640 nm to stimulate Cy5. The fluorescence emission 25 released from Cy5 upon being scanned with the laser beam 4 is photoelectrically detected by the photomultiplier 33 to produce analog data and the analog data are digitized by the A/D converter 34 to produce digital data. Thus, when digital data of the sample have been stored in the line memory 35, the production of digital image data of the specimen labeled with Cy5 and contained in the micro-array set in the second opening 52 is completed.

When the digital image data of the specimen labeled with Cy5 and contained in the micro-array set in the second opening 52 have been stored in the line memory 35, the control unit 70 further starts the production of digital image data of the specimen labeled with Cy3 and contained in the micro-array set in the second opening 52 and outputs a drive signal to the filter unit motor 75 in accordance with a labeling substance specifying signal, thereby causing it to move the filter unit 27 so that the filter 28c having a property to cut off a light component having a wavelength of 473 nm and transmit light components having wavelengths longer than 473 nm is located in the optical path. The control unit 70 then outputs a drive signal to the third laser stimulating ray source 3, thereby turning it on.

The laser beam 4 emitted from the third laser stimulating ray source 3 is reflected by the second dichroic mirror 8 to enter the optical head 15.

The laser beam 4 entering the optical unit 15 is reflected by the mirror 16, passes through the hole 17 formed in the perforated mirror 18 and through the lens 19 to impinge on the sample 22, the micro-array set in the second opening 52 of the sample carrier 21.

Since the sample stage 20 is moved by the main scanning motor 43 in the main scanning direction indicated by the arrow X in FIG. 3 and is moved by the sub-scanning motor 47 in the sub-scanning direction indicated by the arrow Y in FIG. 3, the whole surface of the micro-array set in the second opening 52 of the sample carrier 21 is scanned with the laser beam 4.

When being irradiated with the laser beam 4, Cy3 labeling the probe DNA is stimulated by the laser beam 4, thereby releasing fluorescence emission 25. In the case where a slide glass plate is used as a substrate of the micro-array, since a fluorescent dye is distributed on only the surface of the slide glass plate, fluorescence emission 25 is released from only the surface of the slide glass plate.

The fluorescence emission 25 released from the slide glass plate passes through the lens 19, thereby being made a parallel beam, and is reflected by the perforated mirror 18, thereby entering the filter unit 27.

Since the filter unit 27 has been moved so that the filter 28c is located in the optical path, the fluorescence emission enters the filter 28c, thereby cutting light having a wavelength of 473 nm and transmitting only light having a wavelength longer than 473 nm.

The fluorescence emission transmitted through the filter 28c is reflected by the mirror 29 and focused by the lens 30.

Since the confocal switching member 31 has been moved prior to the irradiation with the laser beam 4 so that the pinhole 32a having the smallest diameter is located in the optical path, the fluorescence emission 25 is focused onto the pinhole 32a and is photoelectrically detected by the photomultiplier 33 thereby producing analog data.

Fluorescence emission 25 released from a fluorescent dye on the surface of the slide glass plate is led to the photomultiplier 33 using a confocal optical system to be photoelectrically detected in this manner and, therefore, noise in the data can be minimized.

The analog data produced by the photomultiplier 33 are converted to a digital data by the A/D converter 34 and the digital data are stored in the line memory 35.

In this manner, the sample stage 20 is reciprocated by the main scanning motor 43 in the main scanning direction and is moved by the sub-scanning motor 47 in the sub-scanning direction and the whole surface of the micro-array in which a number of spots of the specimen selectively labeled with Cy3 on the slide glass plate and which is set in the second opening 52 of the sample carrier 21 is scanned with the laser beam 4 having a wavelength of 473 nm to stimulate Cy3. The fluorescence emission 25 released from Cy3 upon being scanned with the laser beam 4 is photoelectrically detected by the photomultiplier 33 to produce analog data and the analog data are digitized by the A/D converter 34 to produce digital data. Thus, when digital data of the sample have been stored in the line memory 35, the production of digital image data of the specimen labeled with Cy3 and contained in the micro-array set in the second opening 52 is completed.

Similarly to the above, the whole surface of the micro-array in which a number of spots of the specimen selectively labeled with Cy5 on the slide glass plate and which is set in the third opening 53 of the sample carrier 21 is scanned with the laser beam 4 having a wavelength of 640 nm to stimulate Cy5, whereby digital image data of the sample labeled with Cy5 and contained in the micro-array set in the third opening 53 and stored in the line memory 35. Further, the whole surface of the micro-array in which a number of spots of the specimen selectively labeled with Cy3 on the slide glass plate and which is set in the third opening 53 of the sample carrier 21 is scanned with the laser beam 4 having a wavelength of 473 nm to stimulate Cy3, whereby digital image data of the sample labeled with Cy3 and contained in the micro-array set in the third opening 53 and stored in the line memory 35. Furthermore, the whole surface of the micro-array in which a number of spots of the specimen selectively labeled with Cy5 on the slide glass plate and which is set in the fourth opening 54 of the sample carrier 21 is scanned with the laser beam 4 having a wavelength of 640 nm to stimulate Cy5, whereby digital image data of the sample labeled with Cy5 and contained in the micro-array set in the fourth opening 54 and stored in the line memory 35. Further, the whole surface of the micro-array in which a number of spots of the specimen selectively labeled with Cy3 on the slide glass plate and which is set in the fourth opening 54 of the sample carrier 21 is scanned with the laser beam 4 having a wavelength of 473 nm to stimulate Cy3, whereby digital image data of the sample labeled with Cy3 and contained in the micro-array set in the fourth opening 54 and stored in the line memory 35. Moreover, the whole surface of the micro-array in which a number of spots of the specimen selectively labeled with Cy5 on the slide glass plate and which is set in the fifth opening 55 of the sample carrier 21 is scanned with the laser beam 4 having a wavelength of 640 nm to stimulate Cy5, whereby digital image data of the sample labeled with Cy5 and contained in the micro-array set in the fifth opening 55 and stored in the line memory 35. Further, the whole surface of the micro-array in which a number of spots of the specimen selectively labeled with Cy3 on the slide glass plate and which is set in the fifth opening 55 of the sample carrier 21 is scanned with the laser beam 4 having a wavelength of 473 nm to stimulate Cy3, whereby digital image data of the sample labeled with Cy3 and contained in the micro-array set in the fifth opening 55 and stored in the line memory 35.

Thus, when digital image data of the specimen labeled with Cy5 and digital image data of the specimen labeled with Cy3 are produced by scanning the five micro-arrays set in the sample carrier 21 with the laser beam 4 having a wavelength of 640 nm and the laser beam 4 having a wavelength of 473 nm respectively and stored in the line memory 35, data file names are assigned to the thus produced sets of digital image data. In this embodiment, the image reading apparatus is constituted so that correlated sets of digital image data can, in accordance with a predetermined rule, be automatically assigned a common basic file name plus additional character strings for clarifying the relationship between or among the sets of digital image data or that the user can, if desired, assign a different data file name to each set of digital image data. More specifically, in the image reading apparatus according to this embodiment, when data file names are to be assigned to sets of produced digital image data, it is possible to select a naming rule mode under which the image reading apparatus automatically assigns additional character strings for clarifying the relationship between sets of digital image data having the same basic data file name according to a predetermined rule and when the user selects the naming rule mode, data file names are created by automatically assigning additional character strings for clarifying the relationship between the sets of digital image data having the same basic data file name to a basic data file name common to a plurality sets of digital image data specified by the user according to a predetermined rule and assigned to the sets of digital image data. On the other hand, when the user does not select the naming rule mode, a data file name specified by the user is assigned to each set of produced digital image data.

When a data file name or names are to be assigned, the user first inputs a data file name specifying signal through the keyboard 77.

The data file name specifying signal is output to the control unit 70 and when the control unit 70 receives the data file name specifying signal, the control unit 70 displays a data file name setting window on the screen of the CRT 79.

Figure 6:
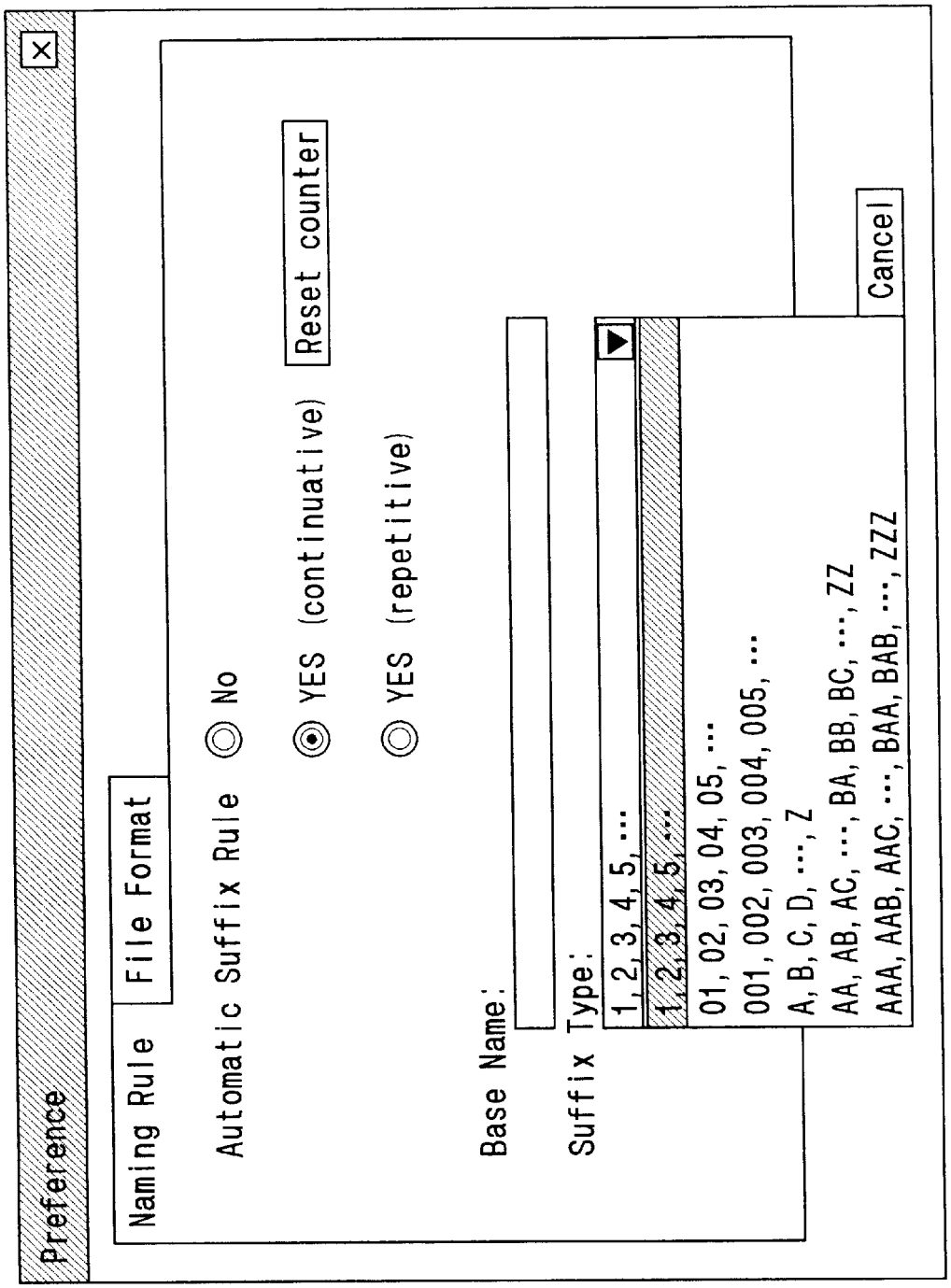
FIG. 6 shows a screen of a CRT when a "YES (continuative)" button was clicked and the set of additional character strings "1, 2, 3, 4, 5, . . " is selected.

FIG. 6 shows the data file name setting window displayed on the screen of the CRT 79 in this manner.

As shown in FIG. 6, the data file name setting window displayed on the screen of the CRT 79 includes a "Base Name" entry box and when the naming rule mode is selected, a data file name entered in the "Base Name" entry box is assigned to one or more sets of digital image data to be produced as a basic data file name.

As shown in FIG. 6, the data file name setting window displayed on the screen of the CRT 79 further includes three "Automatic Suffix Rule" selection buttons. When the "No" button is selected using the mouse 78, the image reading apparatus assigns the data file names the user entered in the "Base Name" entry box to the respective sets of digital image data.

More specifically, when the "No" button among the "Automatic Suffix Rule" selection buttons is selected by the user using the mouse 78, the data file setting window is cleared from the screen of the CRT 79 and the user can input an arbitrary data file name through the keyboard 77.

For example, when "HUMAN" is entered as the data file name, the input data file name is output to the control unit 70 and the control unit 70 outputs the input data file name to the data file name assigning means 71 as a basic data file name and produces a folder having the name "HUMAN" in the data storing means 73 in accordance with the basic data file name.

On the other hand, when a "Yes (continuative)" button or a "Yes (repetitive)" button among the three "Automatic Suffix Rule" selection buttons is selected using the mouse 78, the image reading apparatus assigns additional character strings to the basic data file name the user entered in the "Base Name" entry box in accordance with the rule and the selected type (set) of additional character strings and produces associated folders in the data storing means 73 and assigns the data file names to the sets of digital image data.

For example, in the case where the five micro-arrays set in the sample carrier 21 contain a substance gathered from the same living organism or the same kind of living organism, since the sets of digital image data to be produced based on the five micro-arrays are correlated with each other, it is preferable to assign a common basic data file name and further assign additional character strings for clarifying the correlation, thereby determining data file names and storing the sets of digital image data in the same folder. Therefore, in such a case, the user enters "HUMAN," for example, in the "Base Name" entry box as a basic data file name common to the sets of digital image data to be produced based on the five micro-arrays set in the sample carrier 21 and selects an addition rule of additional character strings to be added to the basic data file name by clicking the "Yes (continuative)" button or the "Yes (repetitive)" button using the mouse 78.

When the "Yes (continuative)" button or the "Yes (repetitive)" button is selected using the mouse 78, an additional character string addition rule selection signal is output to the control unit 70.

When the control unit 70 receives the additional character string addition rule selection signal, it accesses the additional character string storing means 72 to read additional character strings stored in the additional character string storing means 72 and displays a plurality of of sets of additional character strings read from the additional character string storing means 72 in the "Suffix Type" display box in the data file name setting window. (As will be noted from the highlighted string 1, 2, 3, 4, 5 . . . in FIG. 6, a "string" as termed with respect to the present invention may consist of only a single character.)

When the user uses the mouse 78 to click one of the sets (types) of additional character strings displayed in the "Suffix Type" display box in the data file name setting window, for example, the type "1, 2, 3, 4, 5, . ." an additional character string determining signal requesting addition of additional character strings of the selected type to the basic data file name is output to the control unit 70.

FIG. 6 shows the screen of a CRT when the "YES (continuative)" button was clicked and the additional character string type "1, 2, 3, 4, 5, . . . " was selected.

Since the "YES (continuative)" button is selected in the case where sets of digital image data are to be produced by repeatedly setting micro-arrays containing a substance gathered from the same living organism or the same kind of living organism in the sample carrier 21, if the "YES (continuative)" button is selected, then when sets of digital image data are produced based on the micro-arrays repeatedly set in the sample carrier 21, the control unit 70 produces folders having names created by adding additional serial character strings to the basic data file name the user entered in the "Base Name" entry box in the data storing section 73.

For example, in the case where the user enters "HUMAN" in the "Base Name" entry box as a basic data file name and selects the type "1, 2, 3, 4, 5 . . . " as the type of additional character string after selecting the "YES (continuative)"

button using the mouse 78, the control unit 70 produces folders having names created by adding additional serial strings to the basic data file name, in the manner of "HUMAN-1", "HUMAN-2", "HUMAN-3", "HUMAN-4" and "HUMAN-5," in the data storing section 73 correspondingly to the five micro-arrays set in the first opening 51, the second opening 52, the third opening 53, the fourth opening 54 and the fifth opening 55 in the sample carrier 21.

Further, in the case where the "YES (continuative)" button is selected, the data file name assigning means 71 assigns data file names created by adding designations indicating the wavelengths λ of the laser beams used for scanning the micro-arrays to the terminal ends of the associated folder names to the sets of digital image data and stores them in the folders having the associated names in the data storing section 73.

For example, in the case where the user enters "HUMAN" in the "Base Name" entry box as a basic data file name and selects the type "1, 2, 3, 4, 5, . . . " as the type of additional character string, the data file name assigning means 71 assigns, in accordance with the wavelengths λ of the laser beams used for scanning the micro-arrays, the data file names "HUMAN-1-λ", "HUMAN-2-λ", "HUMAN-3-λ", "HUMAN-4-λ" and "HUMAN-5-λ" to the sets of digital image data correspondingly to the five micro-arrays set in the first opening 51, the second opening 52, the third opening 53, the fourth opening 54 and the fifth opening 55 in the sample carrier 21.

To the contrary, the "Yes (repetitive)" button is to be selected in the case where the five micro-arrays contain a substance gathered from the same living organism or the same kind of living organism but the kind of substances derived from the living organism and contained in the micro-arrays differ depending upon the sample carrier 21. When the user selects the "Yes (repetitive)" button, enters a different basic data file namein the "Base Name" entry box for each sample carrier 21, a common type of additional character strings is used so that the control unit 70 produces folders having names created by adding additional serial character strings of the same type to different basic data file names for each sample carrier 21 in the data storing section 73.

For example, in the case where the user selects the "Yes (repetitive)" button using the mouse 78, enters "HUMAN" in the "Base Name" entry box as a basic data file name and selects the type "1, 2, 3, 4, 5, . . . " as the type of additional character string after sets of digital image data have been produced by scanning the five micro-arrays set in a first sample carrier 21 with the laser beams 4, the control unit 70 produces folders having names created by adding additional strings to the basic data file name in the manner of "HUMAN-1", "HUMAN-2", "HUMAN-3", "HUMAN-4" and "HUMAN-5," in the data storing section 73 correspondingly to the five micro-arrays set in the first opening 51, the second opening 52, the third opening 53, the fourth opening 54 and the fifth opening 55 in the first sample carrier 21. Then, after sets of digital image data have been produced by scanning the five micro-arrays set in another sample carrier 21 with the laser beams 4 and when the user enters "MOUSE" in the "Base Name" entry box as a basic data file name, the control unit 70 produces folders having names created by adding additional serial strings to the basic data file name, in the manner of "MOUSE-1", "MOUSE-2", "MOUSE-3", "MOUSE-4" and "MOUSE-5," in the data storing section 73 correspondingly to the five micro-arrays set in the first opening 51, the second opening 52, the third opening 53, the fourth opening 54 and the fifth opening 55 in another sample carrier 21.

When the "Yes (repetitive)" button is further selected, the data file name assigning means 71 assigns data file names created by adding the designations indicating the wavelengths λ of the laser beams used for scanning the micro-arrays to the terminal ends of the associated folder names to the sets of digital image data and stores them in the folders having the associated names in the data storing section 73.

For example, in the case where the user selects the "Yes (repetitive)" button using the mouse 78, enters "HUMAN" in the "Base Name" entry box as a basic data file name and selects the type "1, 2, 3, 4, 5, . . . " as the type of additional character string after sets of digital image data have been produced by scanning the five micro-arrays set in a first sample carrier 21 with the laser beams 4, the data file name assigning means 71 assigns, in accordance with the wavelengths λ of the laser beams used for scanning the micro-arrays, the data file names "HUMAN-1-λ", "HUMAN-2-λ", "HUMAN-3-λ", "HUMAN-4-λ" and "HUMAN-5λ" to the sets of digital image data correspondingly to the five micro-arrays set in the first opening 51, the second opening 52, the third opening 53, the fourth opening 54 and the fifth opening 55 in the first sample carrier 21. Then, after sets of digital image data have been produced by scanning the five micro-arrays set in another sample carrier 21 with the laser beams 4 and when the user enters "MOUSE" in the "Base Name" entry box as a basic data file name, the data file name assigning means 71 assigns, in accordance with the wavelengths λ of the laser beams used for scanning the micro-arrays, the data file names "MOUSE-1-λ", "MOUSE-2-λ", "MOUSE-3-λ", "MOUSE-4-λ" and "MOUSE-5-λ" to the sets of digital image data correspondingly to the five micro-arrays set in the first opening 51, the second opening 52, the third opening 53, the fourth opening 54 and the fifth opening 55 in another sample carrier 21.

Concretely, in this embodiment, when the user selects the "No" button among the "Automatic Suffix Rule" selection buttons displayed on the screen of the CRT 79, the data file setting window is cleared from the screen of the CRT 79 and the user can input an arbitrary data file name through the keyboard 77.

For example, when the users enters "HUMAN" as the data file name of a set of digital image data produced based on the micro-array set in the first opening 51 in the sample carrier 21, the input data file name is output to the control unit 70 and the control unit 70 outputs the input data file name to the data file name assigning means 71 as a basic data file name and produces a folder named "HUMAN" in the data storing means 73 in accordance with the basic data file name.

When the data file name assigning means 71 receives from the control unit 70 "HUMAN" as the data file name of the set of digital image data produced based on the micro-array set in the first opening 51 in the sample carrier 21, since the sets of digital image data produced by scanning the five micro-arrays with the laser beam 4 having a wavelength of 640 nm and emitted from the first laser stimulating ray source 1 and the laser beam 4 having a wavelength of 473 nm and emitted from the second laser stimulating ray source 2 have been stored in the line memory 35 in this embodiment, the data file name assigning means 71 assigns the data file name "HUMAN-640" to the set of digital image data produced by scanning the micro-array set in the first opening 51 in the sample carrier 21 with the laser beam 4 having a wavelength of 640 nm and emitted from the first laser stimulating ray source 1 and stored in the line memory 35, and stores the set of digital image data in the folder having the name "HUMAN" created in the data storing section 73.

The data file name assigning means 71 further assigns the data file name "HUMAN-473" to set of digital image data produced by scanning the micro-array set in the first opening 51 in the sample carrier 21 with the laser beam 4 having a wavelength of 473 nm and emitted from the second laser stimulating ray source 2 and stored in the line memory 35, and stores the set of digital data in the folder having the name "HUMAN" created in the data storing section 73.

A data file name of the set of digital image data produced based on the micro-array set in the second opening 52 in the sample carrier 21 is then entered by the user through the keyboard 77.

For example, when the user enters "MOUSE" as the data file name of the set of digital image data produced based on the micro-array set in the second opening 52 in the sample carrier 21, the entered data file name is output to the control unit 70 and the control unit 70 outputs the input data file name to the data file name assigning means 71 as a basic data file name and produces a folder named as "MOUSE" in the data storing means 73 in accordance with the basic data file name.

In this embodiment, the control unit 70 is constituted so as to access the data storing section 73 and judge whether or not a folder having the same data file name as an entered one was previously created when the data file name is entered through the keyboard 77. Specifically, when a data file name "HUMAN," for example, for which a folder has been already created is entered, the control unit 70 displays a message like "A foldere named "HUMAN" already exists. Please enter another name." on the screen of the CRT 79, thereby advising the user to change the data file name, and displays the data file name setting window on the screen of the CRT 79.

When the data file name assigning means 71 receives from the control unit 70 "MOUSE" as the data file name of a set of digital image data produced based on the micro-array set in the second opening 52 in the sample carrier 21, it assigns a data file name "MOUSE-640" to the set of digital image data produced by scanning the micro-array set in the second opening 52 in the sample carrier 21 with the laser beam 4 having a wavelength of 640 nm and stored in the line memory 35 and stores the set of digital image data in the folder having the name "MOUSE" created in the data storing section 73.

The data file name assigning means 71 further assigns a data file name "MOUSE-473" to the set of digital image data produced by scanning the micro-array set in the second opening 52 in the sample carrier 21 with the laser beam 4 having a wavelength of 473 nm and stored in the line memory 35 and stores the set of digital image data in the folder having the name "MOUSE" created in the data storing section 73.

Further, when data file names of the sets of digital image data produced based on the micro-array set in the third opening 52, the fourth opening 54, and the fifth opening 55 in the sample carrier 21 are respectively entered, the control unit 70 similarly creates folders in the data storing section 73 in accordance with the input data file names and the data file name assigning means 71 assigns data file names associated with the folder names to the sets of digital image data produced based on the micro-array set in the third opening 52, the fourth opening 54, and the fifth opening 55 in the sample carrier 21 and stores the sets of digital image data in the folders created by the control unit 70.

On the other hand, when the "YES (continuative)" button is selected and the type "1, 2, 3, 4, 5, . . . " is selected as the type of additional character strings, the control unit 70 outputs an additional character string addition rule selection signal and an additional character string determining signal to the data file name assigning means 71.

When the user enters "HUMAN", for example, in the "Base Name" entry box as a basic data file name, the control unit 70 outputs the entered "HUMAN" to the data file name assigning means 71 as the basic data file name and creates a folder having the name "HUMAN-1" for storing a set of digital image data produced based on the micro-array set in the first opening 51 in the sample carrier 21 in the data storing section 73 in accordance with the input basic data file name.

In the case where the data file name assigning means 71 has already received the additional character string addition rule selection signal and the additional character string determining signal, when it receives "HUMAN" from the control unit 70 as a basic data file name of the set of digital image data produced based on the micro-array set in the first opening 51 in the sample carrier 21, since digital image data produced by scanning the five micro-arrays with the laser beam 4 having a wavelength of 640 nm and emitted from the first laser stimulating ray source 1 and the laser beam 4 having a wavelength of 473 nm and emitted from the second laser stimulating ray source 2 have been stored in the line memory 35 in this embodiment, the data file name assigning means 71 assigns a data file name "HUMAN-1-640" to the set of digital image data produced by scanning the micro-array set in the first opening 51 in the sample carrier 21 with the laser beam 4 having a wavelength of 640 nm and emitted from the first laser stimulating ray source 1 and stored in the line memory 35, and stores the set of digital image data in the folder having the name "HUMAN-1" created in the data storing section 73.

The data file name assigning means 71 further assigns a data file name "HUMAN-1-473" to the set of digital image data produced by scanning the micro-array set in the first opening 51 in the sample carrier 21 with the laser beam 4 having a wavelength of 473 nm and emitted from the second laser stimulating ray source 2 and stored in the line memory 35, and stores the set of digital image data in the folder having the name "HUMAN-1" created in the data storing section 73.

When the "YES (continuative)" button has been selected and the type "1, 2, 3, 4, 5, . . . " has been selected as the type of additional character strings, the control unit 70 then creates a folder having a name "HUMAN-2" for storing the set of digital image data produced based on the micro-array set in the second opening 52 in the sample carrier 21 in the data storing section 73 in accordance with the input basic data file name "HUMAN".

In the case where the data file name assigning means 71 has already received the additional character string addition rule selection signal and the additional character string determining signal, it further assigns a data file name to the set of digital image data produced based on the micro-array set in the second opening 52 in the sample carrier 21.

More specifically, the data file name assigning means 71 assigns a data file name "HUMAN-2-640" to the set of digital image data produced by scanning the micro-array set in the second opening 52 in the sample carrier 21 with the laser beam 4 having a wavelength of 640 nm and emitted from the first laser stimulating ray source 1 and stored in the line memory 35, and stores the set of digital image data in the folder having the name "HUMAN-2" created in the data storing section 73. The data file name assigning means 71 further assigns a data file name "HUMAN-2-473" to the set of digital image data produced by scanning the micro-array set in the second opening 52 in the sample carrier 21 with the laser beam 4 having a wavelength of 473 nm and emitted from the second laser stimulating ray source 2 and stored in the line memory 35, and stores the set of image data in the folder having the name "HUMAN-2" created in the data storing section 73.

When the "YES (continuative)" button has been selected and the type "1, 2, 3, 4, 5, . . . " has been selected as the type of additional character string, the control unit 70 then creates a folder having the name "HUMAN-3" for storing the set of digital image data produced based on the micro-array set in the third opening 53 in the sample carrier 21 in the data storing section 73 in accordance with the input basic data file name "HUMAN".

In the case where the data file name assigning means 71 has already received the additional character string addition rule selection signal and the additional character string determining signal, it further assigns a data file name "HUMAN-3-640" to the set of digital image data produced by scanning the micro-array set in the third opening 53 in the sample carrier 21 with the laser beam 4 having a wavelength of 640 nm and emitted from the first laser stimulating ray source 1 and stored in the line memory 35, and stores the set of digital image data in the folder having the name "HUMAN-3" created in the data storing section 73. The data file name assigning means 71 further assigns a data file name "HUMAN-3-473" to the set of digital image data produced by scanning the micro-array set in the third opening 53 in the sample carrier 21 with the laser beam 4 having a wavelength of 473 nm and emitted from the second laser stimulating ray source 2 and stored in the line memory 35, and stores the set of digital image data in the folder having the name "HUMAN-3" created in the data storing section 73.

When the "YES (continuative)" button has been selected and the type "1, 2, 3, 4, 5, . . . " has been selected as the type of additional character string, the control unit 70 then creates a folder having the name "HUMAN-4" for the set of storing digital image data produced based on the micro-array set in the fourth opening 54 in the sample carrier 21 in the data storing section 73 in accordance with the input basic data file name "HUMAN".

In the case where the data file name assigning means 71 has already received the additional character string addition rule selection signal and the additional character string determining signal, it further assigns a data file name "HUMAN-4-640" to the set of digital image data produced by scanning the micro-array set in the fourth opening 54 in the sample carrier 21 with the laser beam 4 having a wavelength of 640 nm and emitted from the first laser stimulating ray source 1 and stored in the line memory 35, and stores the set of digital image data in the folder having the name "HUMAN-4" created in the data storing section 73. The data file name assigning means 71 further assigns a data file name "HUMAN-4-473" to the set of digital image data produced by scanning the micro-array set in the fourth opening 54 in the sample carrier 21 with the laser beam 4 having a wavelength of 473 nm and emitted from the second laser stimulating ray source 2 and stored in the line memory 35, and stores the set of digital image data in the folder having the name "HUMAN-4" created in the data storing section 73.

When the "YES (continuative)" button has been selected and the type "1, 2, 3, 4, 5, . . . " has been selected as the type of additional character string, the control unit 70 then creates a folder having the name "HUMAN-5" for storing the set of digital image data produced based on the micro-array set in the fifth opening 55 in the sample carrier 21 in the data storing section 73 in accordance with the input basic data file name "HUMAN".

In the case where the data file name assigning means 71 has already received the additional character string addition rule selection signal and the additional character string determining signal, it further assigns a data file name "HUMAN-5-640" to the set of digital image data produced by scanning the micro-array set in the fifth opening 55 in the sample carrier 21 with the laser beam 4 having a wavelength of 640 nm and emitted from the first laser stimulating ray source 1 and stored in the line memory 35, and stores the set of digital image data in the folder having the name "HUMAN-5" created in the data storing section 73. The data file name assigning means 71 further assigns a data file name "HUMAN-5-473" to the set of digital image data produced by scanning the micro-array set in the fifth opening 55 in the sample carrier 21 with the laser beam 4 having a wavelength of 473 nm and emitted from the second laser stimulating ray source 2 and stored in the line memory 35, and stores the set of digital image data in the folder having the name "HUMAN-5" created in the data storing section 73.

To the contrary, when the "Yes (repetitive)" button is selected and the type "1, 2, 3, 4, 5, . . . " is selected as the type of additional character string, similarly to the case where the "YES (continuative)" button is selected and the type "1, 2, 3, 4, 5, . . . " is selected as the type of additional character string, in the case where the user enters "HUMAN", for example, in the "Base Name" entry box as a basic data file name, the control unit 70 creates a folder having the name "HUMAN-1" for storing the set of digital image data produced based on the micro-array set in the first opening 51 in the sample carrier 21, a folder having the name "HUMAN-2" for storing the set of digital image data produced based on the micro-array set in the second opening 52 in the sample carrier 21, a folder having the name "HUMAN-3" for storing digital image data produced based on the micro-array set in the third opening 53 in the sample carrier 21, a folder having the name "HUMAN-4" for storing the set of digital image data produced based on the micro-array set in the fourth opening 55 in the sample carrier 21, and a folder having the name "HUMAN-5" for storing the set of digital image data produced based on the micro-array set in the fifth opening 55 in the sample carrier 21 in the data storing section 73.

Similarly to the case where the "YES (continuative)" button is selected and the type "1, 2, 3, 4, 5, . . . " is selected as the type of additional character string, the data file name assigning means 71 assigns, in accordance with the laser beams 4 for scanning the micro-array, "HUMAN-1-640" and "HUMAN-1-473" to the sets of digital image data produced based on the micro-array set in the first opening 51 in the sample carrier 21 and stores the sets of digital image data in the folder having the name "HUMAN-1" in the data storing section 73. The data file name assigning means 71 further assigns, in accordance with the laser beams 4 for scanning the micro-array, "HUMAN-2-640" and "HUMAN-2-473" to the sets of digital image data produced based on the micro-array set in the second opening 52 in the sample carrier 21 and stores the sets of digital image data in the folder having the name "HUMAN-2" in the data storing section 73. The data file name assigning means 71 furthermore assigns, in accordance with the laser beams 4 for scanning the micro-array, "HUMAN-3-640" and "HUMAN-3-473" to the sets of digital image data produced based on the micro-array set in the third opening 53 in the sample carrier 21 and stores the sets of digital image data in the folder having the name "HUMAN-3" in the data storing section 73. The data file name assigning means 71 further assigns, in accordance with the laser beams 4 for scanning the micro-array, "HUMAN-4-640" and "HUMAN-4-473" to the sets of digital image data produced based on the micro-array set in the fourth opening 54 in the sample carrier 21 and stores the sets of digital image data in the folder having the name "HUMAN-4" in the data storing section 73. The data file name assigning means 71 furthermore assigns, in accordance with the laser beams 4 for scanning the micro-array, "HUMAN-5-640" and "HUMAN-5-473" to the sets of digital image data produced based on the micro-array set in the fifth opening 55 in the sample carrier 21 and stores the sets of digital image data in the folder having the name "HUMAN-5" in the data storing section 73.

When data file names have been assigned to sets of digital image data produced based on the five micro-arrays first set in the sample carrier 21 and the sets of digital image data have been stored in the folders to which the folder names have been added by the user and which have been created in the data storing section 73, the control unit 70 outputs drive signals to the main scanning motor 43 and the sub-scanning motor 47, thereby causing them to return the sample stage to the original position thereof.

Another five micro-arrays are newly set by the user in the first opening 51, the second opening 52, the third opening 53, the fourth opening 54 and the fifth opening 55 of the sample carrier 21 and a second sample carrier 21 is placed on the sample stage 20.

When the second sample carrier 21 carrying the further five micro-arrays set in the first opening 51, the second opening 52, the third opening 53, the fourth opening 54 and the fifth opening 55 is newly set on the sample stage 20, the kind of the second sample carrier 21 is detected by the carrier sensor 74 and a carrier detection signal is output to the control unit 70.

Since the sample carrier 21 carries five micro-arrays each including a slide glass plate as a substance, when the control unit 70 receives the carrier detection signal from the carrier sensor 74, it outputs a drive signal to the switching member motor 76 based on the carrier detection signal and causes it to move the confocal switching member 31 so that the pinhole 32a having the smallest diameter is located in the optical path.

The kind of a labeling substance, a fluorescent dye is further input by the user through the keyboard 77 and a labeling substance specifying signal is output from the keyboard 77 to the control unit 70.

In this embodiment, the specimen contained in the five micro-arrays newly set in the sample carrier 21 is also labeled with Cy5 (registered trademark) and Cy3 (registered trademark) and, therefore, Cy5 and Cy3 are input by the user as the kinds of fluorescent dyes labeling the specimen through the keyboard 77.

The control unit 70 turns on the first laser stimulating ray source 1 and similarly to the case of the micro-arrays first set in the sample carrier 21, digital image data are produced by scanning the whole surface of the micro-array set in the first opening 51 in the sample carrier 21 with the laser beam 4 having a wavelength of 640 nm and stored in the line memory 35.

The control unit 70 then turns on the third stimulating ray source 3 and similarly to the case of the micro-arrays first set in the sample carrier 21, digital image data are produced by scanning the whole surface of the micro-array set in the first opening 51 in the sample carrier 21 with the laser beam 4 having a wavelength of 473 nm and stored in the line memory 35.

The control unit 70 further turns on the first laser stimulating ray source 1 and digital image data are produced by scanning the whole surface of the micro-array set in the second opening 52 in the sample carrier 21 with the laser beam 4 having a wavelength of 640 nm and stored in the line memory 35.

The control unit 70 then turns on the third laser stimulating ray source 3 and digital image data are produced by scanning the whole surface of the micro-array set in the second opening 52 in the sample carrier 21 with the laser beam 4 having a wavelength of 473 nm and stored in the line memory 35.

Similarly, when micro-arrays newly set in the third opening 53, the fourth opening 54 and the fifth opening 55 in the sample carrier 21 are scanned with the laser beam 4 having a wavelength of 640 nm and emitted from the first laser stimulating ray source 1 and the laser beam 4 having a wavelength of 473 nm and emitted from the third laser stimulating ray source 3, whereby digital image data are produced and stored in the line memory 35, assignment of data file names to digital image data and reservation of digital image data in the data storing section 73 are performed.

In the case where the user selected the "No" button among the "Automatic Suffix Rule" selection buttons when data file names were assigned to the sets of digital image data produced based on the five micro-arrays first set in the sample carrier 21, if arbitrary data file names are to be assigned without adding additional character strings to a basic data file name in accordance with the naming rule to the sets of digital image data produced based on the five micro-arrays newly set in the sample carrier 21, the user inputs a file name assignment instruction signal through the keyboard 77 and further enters data file names to be assigned to the sets of digital image data produced based on the micro-arrays set in the first opening 51, the second opening 52, the third opening 53, the fourth opening 54 and the fifth opening 55 in the sample carrier 21 through the keyboard 77.

When the control unit 70 receives the file name assignment instruction signal, similarly to the assignment of data file names to the sets of digital image data produced based on the five micro-arrays first set in the sample carrier 21, the control unit 70 creates folders having names determined in accordance with data file names input by the user in the data storing section 73 and the data file name assigning means 71 assigns, similarly to the assignment of data file names to the sets of digital image data produced based on the five micro-arrays first set in the sample carrier 21, data file names to the sets of digital image data produced based on the micro-arrays set in the first opening 51, the second opening 52, the third opening 53, the fourth opening 54 and the fifth opening 55 in the sample carrier 21 and stores the digital image data in the folders created by the control unit 70 in the data storing section 73.

To the contrary, in the case where the user selected the "No" button among the "Automatic Suffix Rule" selection buttons when data file names were assigned to the sets of digital image data produced based on the five micro-arrays first set in the sample carrier 21, if data file names created by adding additional character strings to basic data file names are to be assigned in accordance with the naming rule to digital image data produced based on the five micro-arrays newly set in the sample carrier 21, the user inputs a data file name specifying signal through the keyboard 77.

The data file name specifying signal is output to the control unit 70 and when the control unit 70 receives the data file specifying signal, the control unit 70 displays a data file name setting window on the screen of the CRT 79.

When the the user selects the "Yes (continuative)" button or the "Yes (repetitive)" button among the "Automatic Suffix Rule" selection buttons, an additional character string addition rule selection signal is output to the control unit 70.

When the control unit 70 receives the additional character string addition rule selection signal, it accesses the additional character string storing means 72 to read additional character strings stored in the additional character string storing means 72 and displays a plurality of sets (types) of the additional character strings read from the additional character string storing means 72 in the "Suffix Type" display box in the data file name setting window.

When the user uses the mouse 78 to click one of the plurality of additional character strings displayed in the "Suffix Type" display box in the data file name setting window, for example, the type "1, 2, 3, 4, 5, . . . , ", an additional character string determining signal requesting addition of additional character strings of the selected type to the basic data file name is output to the control unit 70.

Then, the user enters "HUMAN", for example, in the "Base Name" entry box through the keyboard 77 as a basic data file name.

In this manner, when one of the "Yes (continuative)" button and the "Yes (repetitive)" button among the "Automatic Suffix Rule" selection buttons and the type of additional character are selected and the user enters "HUMAN", for example, in the "Base Name" entry box through the keyboard 77 as a basic data file name, similarly to the assignment of data file names to the digital image data produced based on the five micro-arrays first set in the sample carrier 21, the control unit 70 creates folders having names created by adding additional character stings to a basic data file name in the data storing section 73 correspondingly to the micro-arrays set in the first opening 51, the second opening 52, the third opening 53, the fourth opening 54 and the fifth opening 55 in the sample carrier 21 and the data file name assigning means 71 assigns data file names created by adding additional character strings and designations indicating the wavelengths of the laser beams 4 to the basic data file name to the sets of digital image data produced based on the micro-arrays set in the first opening 51, the second opening 52, the third opening 53, the fourth opening 54 and the fifth opening 55 in the sample carrier 21 so as to correspond to the micro-arrays set in the first opening 51, the second opening 52, the third opening 53, the fourth opening 54 and the fifth opening 55 in the sample carrier 21 and the wavelengths of the laser beams 4 used for scanning them and stores the sets of digital image data in the folders having associated folder names in the data storing section 73.

On the other hand, in the case where the user selected the "Yes (repetitive)" button among the "Automatic Suffix Rule" selection buttons when data file names were assigned to the sets of digital image data produced based on the five micro-arrays first set in the sample carrier 21, if arbitrary data file names are to be assigned without adding additional character strings to a basic data file name in accordance with the naming rule to the sets of digital image data produced based on the five micro-arrays newly set in the sample carrier 21, the user enters data file names through the keyboard 77 for the sets of digital image data produced based on the micro-arrays set in the first opening 51, the second opening 52, the third opening 53, the fourth opening 54 and the fifth opening 55 in the sample carrier 21.

Similarly to the assignment of data file names to the digital image data produced based on the five micro-arrays first set in the sample carrier 21, the control unit 70 creates folders having names determined in accordance with data file names input by the user in the data storing section 73 and the data file name assigning means 71 assigns, similarly to the assignment of data file names to the sets of digital image data produced based on the five micro-arrays first set in the sample carrier 21, data file names to the sets of digital image data produced based on the micro-arrays set in the first opening 51, the second opening 52, the third opening 53, the fourth opening 54 and the fifth opening 55 in the sample carrier 21 and stores the sets of digital image data in the folders created by the control unit 70 in the data storing section 73.

To the contrary, in the case where the user selected the "Yes (repetitive)" button among the "Automatic Suffix Rule" selection buttons when data file names were assigned to the sets of digital image data produced based on the five micro-arrays first set in the sample carrier 21, if data file names created by adding additional character strings to basic data file names are to be assigned in accordance with the naming rule to the sets of digital image data produced based on the five micro-arrays newly set in the sample carrier 21, the user inputs a data file name specifying signal through the keyboard 77.

The data file name specifying signal is output to the control unit 70 and when the control unit 70 receives the data file specifying signal, the control unit 70 displays a data file name setting window on the screen of the CRT 79.

In this case, since data file names created by adding additional character strings to a basic data file name in accordance with a different naming rule from that used when data file names were assigned to the sets of digital image data produced based on the five micro-arrays first set in the sample carrier 21 are to be assigned, the uses selects the "YES (continuative)" button among the "Automatic Suffix Rule" selection buttons in the data file name setting window displayed on the screen of the CRT 79 and an additional character string addition rule selection signal is output to the control unit 70.

When the control unit 70 receives the additional character string addition rule selection signal, it accesses the additional character string storing means 72 to read additional character strings stored in the additional character string storing means 72 and displays a plurality of types (sets) of the additional character strings read from the additional character string storing means 72 in the "Suffix Type" display box in the data file name setting window.

When the user uses the mouse 78 to click one of the sets of additional character strings displayed in the "Suffix Type" display box in the data file name setting window, for example, the type "1, 2, 3, 4, 5, . . . ,", an additional character string determining signal requesting addition of the type of the additional character strings to the basic data file name is output to the control unit 70.

The user enters a basic data file name in the "Base Name" entry box in the data file name setting window through the keyboard 77.

For example, when the user enters "MOUSE" as a basic data file name, similarly to the case of the image data produced based on the micro-arrays first set in the sample stage 21, the control unit 70 creates folders having names created by adding the additional serial strings to the basic data file name in the data storing section 73 so as to correspond to the micro-arrays set in the first opening 51, the second opening 52, the third opening 53, the fourth opening 54 and the fifth opening 55 in the sample carrier 21 and the data file name assigning means 71 assigns data file names created by adding additional character strings and designations indicating the wavelengths of the laser beams 4 to the basic data file names to the sets of digital image data produced based on the micro-arrays set in the first opening 51, the second opening 52, the third opening 53, the fourth opening 54 and the fifth opening 55 in the sample carrier 21 so as to correspond to the micro-arrays set in the first opening 51, the second opening 52, the third opening 53, the fourth opening 54 and the fifth opening 55 in the sample carrier 21 and the wavelengths of the laser beams 4 used for scanning them and stores the sets of digital image data in the folders having associated names in the data storing section 73.

To the contrary, when "HUMAN" is input by the user to the "Base Name" entry box in the data file name setting window as a basic data file name, since a folder having the name "HUMAN" was previously created in the data storing section 73 when the sets of digital image data produced based on the micro-arrays first set in the sample carrier 21 were saved in the data storing section 73, the control unit 70 displays a message like "A folder named "HUMAN" already exists. Please enter another name." on the screen of the CRT 79, thereby advising the user to change the data file name, and displays the data file name setting window on the screen of the CRT 79.

On the other hand, in the case where the user selected the "Yes (repetitive)" button among the "Automatic Suffix Rule" selection buttons when data file names were assigned to the sets of digital image data produced based on the five micro-arrays first set in the sample carrier 21, if data file names created by adding additional character strings to basic data file names are to be assigned to the sets of digital image data produced based on the five micro-arrays newly set in the sample carrier 21 in accordance with the same naming rule, the user inputs a data file name specifying signal through the keyboard 77.

The data file name specifying signal is output to the control unit 70 and when the control unit 70 receives the data file name specifying signal, it displays the data file name setting window on the screen of the CRT 79.

When the data file name setting window is displayed on the screen of the CRT 79, the user enters a basic data file name in the "Base Name" entry box in the data file name setting window.

At this time, if the user enters "HUMAN" in the "Base Name" entry box as a basic data file name, since a folder having the name "HUMAN" was previously created in the data storing section 73 when the digital image data produced based on the micro-arrays first set in the sample carrier 21 were saved in the data storing section 73, the control unit 70 displays a message "A folder named "HUMAN" already exists. Please enter another name." or the like on the screen of the CRT 79, thereby advising the user to change the data file name, and displays the data file name setting window on the screen of the CRT 79.

To the contrary, when "MOUSE" is input by the user as a basic data file name, similarly to the case where the user selected the "Yes (continuative)" button among the "Automatic Suffix Rule" selection buttons and the data file names were assigned to the sets of digital image data produced based on the five micro-arrays first set in the sample carrier 21, the control unit 70 creates folders having names created by adding additional character strings to a basic data file name in the data storing section 73 correspondingly to the micro-arrays set in the first opening 51, the second opening 52, the third opening 53, the fourth opening 54 and the fifth opening 55 in the sample carrier 21 and the data file name assigning means 71 assigns data file names created by adding additional character strings and designations indicating the wavelengths of the laser beams 4 to the basic data file name to the sets of digital image data produced based on the micro-arrays set in the first opening 51, the second opening 52, the third opening 53, the fourth opening 54 and the fifth opening 55 in the sample carrier 21 so as to correspond to the micro-arrays set in the first opening 51, the second opening 52, the third opening 53, the fourth opening 54 and the fifth opening 55 in the sample carrier 21 and the wavelengths of the laser beams 4 used for scanning them and stores the sets of digital image data in the folders having associated names in the data storing section 73.

On the other hand, in the case where the user selected the "Yes (continuative)" button among the "Automatic Suffix Rule" selection buttons when data file names were assigned to the sets of digital image data produced based on the five micro-arrays first set in the sample carrier 21, if arbitrary data file names are to be assigned without adding additional character strings to a basic data file name in accordance with the naming rule to digital image data produced based on the five micro-arrays newly set in the sample carrier 21, the user enters data file names through the keyboard 77 for the sets of digital image data produced based on the micro-arrays set in the first opening 51, the second opening 52, the third opening 53, the fourth opening 54 and the fifth opening 55 in the sample carrier 21.

Similarly to the assignment of data file names to the digital image data produced based on the five micro-arrays first set in the sample carrier 21, the control unit 70 creates folders having names determined in accordance with data file names input by the user in the data storing section 73 and the data file name assigning means 71 assigns, similarly to the assignment of data file names to the digital image data produced based on the five micro-arrays first set in the sample carrier 21, data file names to the sets of digital image data produced based on the micro-arrays set in the first opening 51, the second opening 52, the third opening 53, the fourth opening 54 and the fifth opening 55 in the sample carrier 21 and stores the sets of digital image data in the folders created by the control unit 70 in the data storing section 73.

To the contrary, in the case where the user selected the "Yes (continuative)" button among the "Automatic Suffix Rule" selection buttons when data file names were assigned to the sets of digital image data produced based on the five micro-arrays first set in the sample carrier 21, if data file names created by adding additional character strings to basic data file names are to be assigned to the sets of digital image data produced based on the five micro-arrays newly set in the sample carrier 21 in accordance with a different naming rule from that used when data file names were assigned to the sets of digital image data produced based on the five micro-arrays first set in the sample carrier 21, the user inputs a data file name specifying signal through the keyboard 77.

The data file name specifying signal is output to the control unit 70 and when the control unit 70 receives the data file specifying signal, the control unit 70 displays a data file name setting window on the screen of the CRT 79.

In this case, since data file names created by adding additional character strings to a basic data file name in accordance with a different naming rule from that used when data file names were assigned to the sets of digital image data produced based on the five micro-arrays first set in the sample carrier 21 are to be assigned, the user selects the "YES (repetitive)" button among the "Automatic Suffix Rule" selection buttons in the data file name setting window displayed on the screen of the CRT 79 and an additional character string addition rule selection signal is output to the control unit 70.

When the control unit 70 receives the additional character string addition rule selection signal, it accesses the additional character string storing means 72 to read additional character strings stored in the additional character string storing means 72 and displays of a plurality of types (sets) of the additional character strings read from the additional character string storing means 72 in the "Suffix Type" display box in the data file name setting window.

When the users uses the mouse 78 to click one of the types of additional character strings displayed in the "Suffix Type" display box in the data file name setting window, for example, the type "1, 2, 3, 4, 5, . . . ," an additional character string determining signal requesting addition of the type of the additional character string to the basic data file name is output to the control unit 70.

The user enters a basic data file name in the "Base Name" entry box in the data file name setting window through the keyboard 77.

For example, when the user enters "MOUSE" as a basic data file name, similarly to the case of the image data produced based on the micro-arrays first set in the sample stage 21, the control unit 70 creates folders having names created by adding the additional serial strings to the basic data file name in the data storing section 73 so as to correspond to the micro-arrays set in the first opening 51, the second opening 52, the third opening 53, the fourth opening 54 and the fifth opening 55 in the sample carrier 21 and the data file name assigning means 71 assigns data file names created by adding additional character strings and designation indicating the wavelengths of the laser beams 4 to the basic data file names to the sets of digital image data produced based on the micro-arrays set in the first opening 51, the second opening 52, the third opening 53, the fourth opening 54 and the fifth opening 55 in the sample carrier 21 so as to correspond to the micro-arrays set in the first opening 51, the second opening 52, the third opening 53, the fourth opening 54 and the fifth opening 55 in the sample carrier 21 and the wavelengths of the laser beams 4 used for scanning them and stores the sets of digital image data in the folders having associated names in the data storing section 73.

To the contrary, when the user enters "HUMAN" in the "Base Name" entry box in the data file name setting window as a basic data file name, since a folder having the name "HUMAN-1" was previously created in the data storing section 73 when the sets of digital image data produced based on the micro-arrays first set in the sample carrier 21 were saved in the data storing section 73, the control unit 70 displays a message like "A folder named "HUMAN" already exists. Please enter another name." on the screen of the CRT 79, thereby advising the user to change the data file name, and displays the data file name setting window on the screen of the CRT 79.

On the other hand, in the case where the user selected the "Yes (continuative)" button among the "Automatic Suffix Rule" selection buttons when data file names were assigned to the sets of digital image data produced based on the five micro-arrays first set in the sample carrier 21, if data file names created by adding additional character strings to basic data file names are assigned to the sets of digital image data produced based on the five micro-arrays newly set in the sample carrier 21 in accordance with the same naming rule, the user inputs a data file name specifying signal through the keyboard 77.

In the case where the user selected the "Yes (continuative)" button among the "Automatic Suffix Rule" selection buttons when data file names were assigned to the sets of digital image data produced based on the five micro-arrays first set in the sample carrier 21, when the control unit 70 receives the data file name specifying signal, it outputs the same additional character string addition rule selection signal as that used for assigning the data file names to the sets of digital image data produced based on the five micro-arrays first set in the sample carrier 21 and the additional character string determining signal to the data file name assigning means 71 and also outputs the same basic data file name "HUMAN", for example, to the data file name assigning means 71 as a basic data file name.

At the same time, the control unit 70 creates a folder having the name "HUMAN-6" in the data storing section 73 for storing the sets of digital image data produced based on the micro-array set in the first opening 51 in the sample carrier 21.

In the case where the data file name assigning means 71 has received the additional character string addition rule selection signal and the additional character string determining signal from the control unit 70, when it receives "HUMAN" from the control unit 70 as a basic data file name of the sets of digital image data produced based on the micro-array set in the first opening 51 in the sample carrier 21, the data file name assigning means 71 assigns the data file name "HUMAN-6-640" to the set of digital image data produced by scanning the micro-array set in the first opening 51 in the sample carrier 21 with the laser beam 4 having a wavelength of 640 nm and emitted from the first laser stimulating ray source 1 and stored in the line memory 35 and stores the set of digital image data in the folder having the name "HUMAN-6" created in the data storing section 73.

The data file name assigning means 71 assigns the data file name "HUMAN-6-473" to the set of digital image data produced by scanning the micro-array set in the first opening 51 in the sample carrier 21 with the laser beam 4 having a wavelength of 473 nm and emitted from the third laser stimulating ray source 3 and stored in the line memory 35 and stores the set of digital image data in the folder having the name "HUMAN-6" created in the data storing section 73.

In the case where the user selected the "Yes (continuative)" button among the "Automatic Suffix Rule" selection buttons when data file names were assigned to the sets of digital image data produced based on the five micro-arrays first set in the sample carrier 21, when the control unit 70 receives the data file name specifying signal, it creates a folder having the name "HUMAN-7" in the data storing section 73 for storing the sets of digital image data produced based on the micro-array set in the second opening 52 in the sample carrier 21.

When the additional character string addition rule selection signal and the additional character string determining signal have been input from the control unit 70, the data file name assigning means 71 assigns data file names to the sets of digital image data produced based on the micro-array set in the second opening 52 in the sample carrier 21.

More specifically, the data file name assigning means 71 assigns the data file name "HUMAN-7-640" to the set of digital image data produced by scanning the micro-array set in the second opening 52 in the sample carrier 21 with the laser beam 4 having a wavelength of 640 nm and emitted from the first laser stimulating ray source 1 and stored in the line memory 35, and stores the set of digital image data in the folder having the name "HUMAN-7" created in the data storing section 73. The data file name assigning means 71 further assigns a data file name "HUMAN-7-473" to the set of digital image data produced by scanning the micro-array set in the second opening 52 in the sample carrier 21 with the laser beam 4 having a wavelength of 473 nm and emitted from the second laser stimulating ray source 2 and stored in the line memory 35, and stores the set of digital image data in the folder having the name "HUMAN-7" created in the data storing section 73.

In the case where the user selects the "YES (continuative)" button among the "Automatic Suffix Rule" selection buttons, when the control unit 70 receives the data file name specifying signal, it further creates a folder having the name "HUMAN-8" for storing the sets of digital image data produced based on the micro-array set in the third opening 53 in the sample carrier 21 in the data storing section.

When the additional character string addition rule selection signal and the additional character string determining signal have been input from the control unit 70, the data file name assigning means 71 further assigns a data file name "HUMAN-8-640" to the set of digital image data produced by scanning the micro-array set in the third opening 53 in the sample carrier 21 with the laser beam 4 having a wavelength of 640 nm and emitted from the first laser stimulating ray source 1 and stored in the line memory 35, and stores the set of digital image data in the folder having the name "HUMAN-8" created in the data storing section 73. The data file name assigning means 71 further assigns a data file name "HUMAN-8-473" to the set of digital image data produced by scanning the micro-array set in the third opening 53 in the sample carrier 21 with the laser beam 4 having a wavelength of 473 nm and emitted from the second laser stimulating ray source 2 and stored in the line memory 35, and stores the set of digital image data in the folder having the name "HUMAN-8" created in the data storing section 73.

In the case where the user selects the "YES (continuative)" button among the "Automatic Suffix Rule" selection buttons, when the control unit 70 receives the data file name specifying signal, it further creates a folder having the name "HUMAN-9" for storing sets of digital image data produced based on the micro-array set in the fourth opening 54 in the sample carrier 21 in the data storing section.

When the additional character string addition rule selection signal and the additional character string determining signal have been input from the control unit 70, the data file name assigning means 71 further assigns a data file name "HUMAN-9-640" to the set of digital image data produced by scanning the micro-array set in the fourth opening 54 in the sample carrier 21 with the laser beam 4 having a wavelength of 640 nm and emitted from the first laser stimulating ray source 1 and stored in the line memory 35, and stores the set of digital image data in the folder having the name "HUMAN-9" created in the data storing section 73. The data file name assigning means 71 further assigns a data file name "HUMAN-9-473" to the set of digital image data produced by scanning the micro-array set in the fourth opening 54 in the sample carrier 21 with the laser beam 4 having a wavelength of 473 nm and emitted from the second laser stimulating ray source 2 and stored in the line memory 35, and stores the set of digital image data in the folder having the name "HUMAN-9" created in the data storing section 73.

In the case where the user selects the "YES (continuative)" button among the "Automatic Suffix Rule" selection buttons, when the control unit 70 receives the data file name specifying signal, it further creates a folder having the name "HUMAN-10" for the sets of storing digital image data produced based on the micro-array set in the fifth opening 55 in the sample carrier 21 in the data storing section.

When the additional character string addition rule selection signal and the additional character string determining signal have been input from the control unit 70, the data file name assigning means 71 further assigns a data file name "HUMAN-10-640" to the set of digital image data produced by scanning the micro-arrays set in the fifth opening 55 in the sample carrier 21 with the laser beam 4 having a wavelength of 640 nm and emitted from the first laser stimulating ray source 1 and stored in the line memory 35, and stores the set of digital image data in the folder having the name "HUMAN-10" created in the data storing section 73. The data file name assigning means 71 further assigns a data file name "HUMAN-10-473" to the set of digital image data produced by scanning the micro-array set in the fifth opening 55 in the sample carrier 21 with the laser beam 4 having a wavelength of 473 nm and emitted from the second laser stimulating ray source 2 and stored in the line memory 35, and stores the set of digital image data in the folder having the name "HUMAN-10" created in the data storing section 73.

On the other hand, when image data for biochemical analysis are to be produced by scanning a fluorescence sample including a transfer support containing denatured DNA fragments selectively labeled with a fluorescent dye as a substrate with a laser beam 4 to stimulate the fluorescent dye and photoelectrically detecting fluorescence emission released from the fluorescent dye, a sample carrier 21 carrying a fluorescence sample 22 including a transfer support containing denatured DNA fragments selectively labeled with a fluorescent dye as a substrate is first set by the user on the sample stage 20.

When the sample carrier 21 carrying the fluorescence sample 22 is set on the sample stage 20 in this manner, the kind of the sample carrier 21 is detected by the carrier sensor 74 and a carrier detection signal is output to the control unit 70.

When the control unit 70 receives the carrier detection signal from the carrier sensor 74, it outputs a drive signal to the switching member motor 76 based on the carrier detection signal and causes it to move the confocal switching member 31 so that the pinhole 32c having the largest diameter is located in the optical path.

When the kind of a labeling substance, a fluorescent dye, is input by the user through the keyboard 77, a labeling substance specifying signal is output from the keyboard 77 to the control unit 70.

When the denatured DNA fragments are selectively labeled with Rhodamine (registered trademark), for example, since Rhodamine can be most effectively stimulated by a laser beam having a wavelength of 532 nm, the control unit 50 selects the second laser stimulating ray source 2 and the filter 28b and also outputs a drive signal to the filter unit motor 54, thereby causing it to move the filter unit 27 so that the filter 28b having a property to cut off a light component having a wavelength of 532 nm and transmit light components having wavelengths longer than 532 nm is located in the optical path.

The control unit 50 then outputs a drive signal to the second laser stimulating ray source 2 to turn on the second laser stimulating ray source 2.

The laser beam 4 emitted from the second laser stimulating ray source 2 passes through a collimator lens 9, thereby being made a parallel beam, and advances to the first dichroic mirror 7 to be reflected thereby.

The laser beam 4 reflected by the first dichroic mirror 7 passes through the second dichroic mirror 8 and enters the optical head 15.

The laser beam 4 entering the optical unit 15 is reflected by the mirror 16, passes through the hole 17 formed in the perforated mirror 18 and through the lens 19 to impinge on the fluorescence sample 22 set on the sample stage 20.

Since the sample stage 20 is moved by the main scanning motor 43 in the main scanning direction indicated by the arrow X in FIG. 3 and is moved by the sub-scanning motor 47 in the sub-scanning direction indicated by the arrow Y in FIG. 3, the whole surface of the fluorescence sample 22 set in the sample carrier 21 is scanned with the laser beam 4.

When being irradiated with the laser beam 4, the fluorescent dye labeling the specimen, for example, Rhodamine, is stimulated by the laser beam 4, thereby releasing fluorescence emission 25. In the case where a transfer support is used as a substrate of the fluorescence sample 22, since a fluorescent dye is distributed in the depth direction of the transfer support, fluorescence emission 25 is released from a predetermined region in the depth direction of the transfer support and the positions of the light emitting points fluctuate in the depth direction.

The fluorescence emission 25 released from the fluorescence sample 22 using the transfer support as a substrate passes through the lens 19, thereby being made a parallel beam, and is reflected by the perforated mirror 18, thereby entering the filter unit 27.

Since the filter unit 27 has been moved so that the filter 28b is located in the optical path, the fluorescence emission enters the filter 28b, thereby cutting light having a wavelength of 532 nm and transmitting only light having a wavelength longer than 532 nm.

The fluorescence emission transmitted through the filter 28b is reflected by the mirror 29 and condensed by the lens 30 however, since the fluorescence emission is released from a predetermined region in the depth direction of the transfer support, the fluorescence emission is not focused.

Since the confocal switching member 31 has been moved prior to the irradiation with the laser beam 4 so that the pinhole 32c having the largest diameter is located in the optical path, the fluorescence emission 25 passes through the pinhole 32b and is photoelectrically detected by the photomultiplier 33 thereby producing analog image data. Therefore, although the confocal optical system is employed for detecting fluorescence emission 25 released from a fluorescent dye on the surface of the micro-array using the slide glass plate as a substrate with a high S/N ratio, fluorescence emission 25 released from a predetermined region in the depth direction of the transfer support can be detected with high signal intensity.

The analog image data produced by the photomultiplier 33 are converted to a digital image data by the A/D converter 34 and the digital image data are forwarded to the line memory 35 and stored therein.

Thus, when digital image data produced based on the fluorescence sample 22 are stored in the line memory 35, a data file name is assigned to the set of thus produced digital image data similarly to the case of the five micro-arrays set in the sample carrier 21.

When a data file name is to be assigned, the user first inputs a data file name specifying signal through the keyboard 77.

The data file name specifying signal is output to the control unit 70 and when the control unit 70 receives the data file name specifying signal, the control unit 70 displays a data file name setting window on the screen of the CRT 79.

When the user selects the "No" button among the "Automatic Suffix Rule" selection buttons in the data file name setting window displayed on the screen of the CRT 79, the data file setting window is cleared from the screen of the CRT 79 and the user can enter an arbitrary data file name through the keyboard 77.

For example, when "HUMAN" is entered as the data file name of the set of digital image data produced based on the fluorescence sample 22, the entered data file name is output to the control unit 70 and the control unit 70 outputs the entered data file name to the data file name assigning means 71 as a basic data file name and creates a folder having the name "HUMAN" in the data storing means 73 in accordance with the basic data file name.

Since the set of digital image data produced by scanning the fluorescence sample 22 with the laser beam 4 having a wavelength of 532 nm and emitted from the second laser stimulating ray source 2 are stored in the line memory 35, when the data file name assigning means 71 receives "HUMAN" from the control unit 70 as the data file name of the set of digital image data produced based on the fluorescence sample 22, it assigns a data file name "HUMAN-532" to the set of digital image data produced by scanning the fluorescence sample 22 with the laser beam 4 having a wavelength of 532 nm and emitted from the second laser stimulating ray source 2 and stored in the line memory 35 and stores the set of digital image data in the folder having the name "HUMAN" created in the data storing section 73.

On the other hand, when the users clicks the "Yes (continuative)" button and selects the type "1, 2, 3, 4, 5, . . . " as the type of additional character string, the control unit 70 outputs an additional character string addition rule selection signal and an additional character string determining signal to the data file name assigning means 71.

When the user enters "HUMAN", for example, in the "Base Name" entry box in the data file name setting window through the keyboard 77 as a basic data file name, the control unit 70 outputs "HUMAN" to the data file name assigning means 71 as a basic data file name and creates a folder having the name "HUMAN-1" for storing the set of digital image data produced based on the fluorescence sample 22 in the data storing means 73 in accordance with the input basic data file name.

In the case where the data file name assigning means 71 has received the additional character string addition rule selection signal and the additional character string determining signal, when it receives from the control unit 70 "HUMAN" as the data file name of the set of digital image data produced based on the fluorescence sample 22, the data file name assigning means 71 assigns a data file name "HUMAN-1-532" to set of digital image data produced by scanning the fluorescence sample 22 with the laser beam 4 having a wavelength of 532 nm and emitted from the second laser stimulating ray source 2 and stored in the line memory 35 and stores the set of digital image data in the folder having the name "HUMAN-1" created in the data storing section 73.

To the contrary, when the user clicks the "Yes (repetitive)" button and selects the type "1, 2, 3, 4, 5, . . ." as the type of additional character string, the control unit 70 outputs the additional character string addition rule selection signal and the additional character string determining signal to the data file name assigning means 71. When the user enters "HUMAN", for example, in the "Base Name" entry box in the data file name setting window through the keyboard 77 as a basic data file name, the control unit 70 outputs "HUMAN" to the data file name assigning means 71 as a basic data file name and creates a folder having the name "HUMAN-1" for storing the set of digital image data produced based on the fluorescence sample 22 in the data storing means 73 in accordance with the input basic data file name.

In the case where the data file name assigning means 71 has received the additional character string addition rule selection signal and the additional character string determining signal, when it receives from the control unit 70 "HUMAN" as the data file name of the set of digital image data produced based on the fluorescence sample 22, the data file name assigning means 71 assigns a data file name "HUMAN-1-532" to the set of digital image data produced by scanning the fluorescence sample 22 with the laser beam 4 having a wavelength of 532 nm and emitted from the second laser stimulating ray source 2 and stored in the line memory 35 and stores the set of digital image data in the folder having the name "HUMAN-1" created in the data storing section 73.

When the data file name has been assigned to the set of digital image data produced based on the fluorescence sample 22 set in the sample carrier 21 and the digital image data have been stored in the data storing section 73, since the sample carrier 21 only carries a single fluorescence sample 22 including a transfer support containing denatured DNA fragments selectively labeled with a fluorescent dye, a second fluorescence sample 22 including a transfer support containing denatured DNA fragments selectively labeled with a fluorescent dye is newly set in the sample carrier 21 and the sample carrier 21 is placed on the sample stage 20.

When the sample carrier 21 carrying the second fluorescence sample 22 is set on the sample stage 20 in this manner, the kind of the sample carrier 21 is detected by the carrier sensor 74 and a carrier detection signal is output to the control unit 70.

When the control unit 70 receives the carrier detection signal from the carrier sensor 74, it locates, based on the carrier detection signal, the confocal switching member 31 so that the pinhole 32c having the largest diameter is located in the optical path.

In the case where the specimen contained in the second fluorescence sample 22 is labeled with Rhodamine, the control unit 70 selects the filter 28b and outputs a drive signal to the filter unit motor 54, thereby causing it to move the filter unit 27 so that the filter 28b having a property to cut off a light component having a wavelength of 532 nm and transmit light components having wavelengths longer than 532 nm is located in the optical path and also outputs a drive signal to the second laser stimulating ray source 2 to turn on the second laser stimulating ray source 2.

When the second fluorescence sample 22 is scanned with the laser beam 4 emitted from the second laser stimulating ray source 2 and digital image data are stored in the line memory 35, assignment of a data file name to the set of digital image data and saving of the set of digital image data in the data storing section 73 are performed.

In the case where the user selected the "No" button among the "Automatic Suffix Rule" selection buttons when the data file name was assigned to the set of digital image data produced based on the first fluorescence sample 22 first set in the sample carrier 21, if an arbitrary data file names is to be assigned without adding additional character strings to a basic data file name in accordance with the naming rule to the set of digital image data produced based on the fluorescence sample 22, the user inputs a file name assignment instruction signal through the keyboard 77 and further enters data file name to be assigned to the set of digital image data produced based on the fluorescence sample 22 through the keyboard 77.

When the control unit 70 receives the file name assignment instruction signal, similarly to the assignment of a data file name to the set of digital image data produced based on the first fluorescence sample 22, it creates a folder having a folder name determined in accordance with data file name input by the user in the data storing section 73 and the data file name assigning means 71 assigns, similarly to the assignment of data file name to the set of digital image data produced based on the first fluorescence sample 22, a data file name to digital image data produced based on the second fluorescence sample 22 and stores the set of digital image data in a folder having an associated name created by the control unit 70 in the data storing section 73.

To the contrary, in the case where the user selected the "No" button among the "Automatic Suffix Rule" selection buttons when a data file name was assigned to the set of digital image data produced based on the first fluorescence sample 22, if data file names created by adding additional character strings to basic data file names are to be assigned in accordance with the naming rule to the set of digital image data produced based on the second fluorescence sample 22, the user inputs a data file name specifying signal through the keyboard 77.

The data file name specifying signal is output to the control unit 70 and when the control unit 70 receives the data file specifying signal, the control unit 70 displays a data file name setting window on the screen of the CRT 79.

When the user selects the the "Yes (continuative)" button or the "Yes (repetitive)" button among the "Automatic Suffix Rule" selection buttons, an additional character string addition rule selection signal is output to the control unit 70.

When the control unit 70 receives the additional character string addition rule selection signal, it accesses the additional character string storing means 72 to read additional character strings stored in the additional character string storing means 72 and displays a plurality of types (sets) of the additional character strings read from the additional character string storing means 72 in the "Suffix Type" display box in the data file name setting window.

When the users uses the mouse 78 to click one of the types of additional character strings displayed in the "Suffix Type" display box in the data file name setting window, for example, the type "1, 2, 3, 4, 5 . . . ,", an additional character string determining signal requesting addition the type of the additional character string to the basic data file name is output to the control unit 70.

Then, the user enters "HUMAN", for example, in the "Base Name" entry box through the keyboard 77 as a basic data file name.

In this manner, when the users clicks one of the "Yes (continuative)" button and the "Yes (repetitive)" button among the "Automatic Suffix Rule" selection buttons, selects the type of additional character string and enters "HUMAN", for example, in the "Base Name" entry box through the keyboard 77 as a basic data file name, then similarly to the assignment of data file names to the set of digital image data produced based on the first fluorescence sample 22, the control unit 70 creates a folder having a folder name created by adding additional character strings to a basic data file name in the data storing section 73 and the data file name assigning means 71 assigns the data file name "HUMAN-1-532" to the set of digital image data produced based on the second fluorescence sample 22 and stores the set of digital image data in the folder having the name "HUMAN-1" in the data storing section 73.

On the other hand, in the case where the user selected the "Yes (repetitive)" button among the "Automatic Suffix Rule" selection buttons when a data file name was assigned to the set of digital image data produced based on the first fluorescence sample 22, if arbitrary data file names are to be assigned without adding additional character strings to a basic data file name in accordance with the naming rule to digital image data produced based on the second fluorescence sample 22, the user enters a data file name to be assigned to the set of digital image data produced based on the second fluorescence sample 22 through the keyboard 77.

Similarly to the assignment of a data file name to the set of digital image data produced based on the first fluorescence sample 22, the control unit 70 creates a folder having a name determined in accordance with the data file name the user entered in the data storing section 73 and the data file name assigning means 71 assigns, similarly to the assignment of the data file name to the digital image data produced based on the first fluorescence sample 22, a data file name to the set of digital image data produced based on the second fluorescence sample 22 and stores the digital image data in a folder having an associated name and created by the control unit 70 in the data storing section 73.

To the contrary, in the case where the user selected the "Yes (repetitive)" button among the "Automatic Suffix Rule" selection buttons when data file names were assigned to the set of digital image data produced based on the first fluorescence sample 22, if a data file name created by adding an additional character string to a basic data file name is to be assigned in accordance with the naming rule to the set of digital image data produced based on the second fluorescence sample 22, the user enters a data file name specifying signal through the keyboard 77.

The data file name specifying signal is output to the control unit 70 and when the control unit 70 receives the data file specifying signal, the control unit 70 displays a data file name setting window on the screen of the CRT 79.

In this case, since a data file name created by adding an additional character string to a basic data file name in accordance with a different naming rule from that used when a data file name was assigned to the set of digital image data produced based on the first fluorescence sample 22 is to be assigned, the users selects the "YES (continuative)" button among the "Automatic Suffix Rule" selection buttons in the data file name setting window displayed on the screen of the CRT 79 and an additional character string addition rule selection signal is output to the control unit 70.

When the control unit 70 receives the additional character string addition rule selection signal, it accesses the additional character string storing means 72 to read additional character strings stored in the additional character string storing means 72 and displays a plurality of types (sets) of the additional character strings read from the additional character string storing means 72 in the "Suffix Type" display box in the data file name setting window.

When the user uses the mouse 78 to click one of the plurality of additional character strings displayed in the "Suffix Type" display box in the data file name setting window, for example, the type "1, 2, 3, 4, 5, . . . ,"an additional character string determining signal requesting addition of the type of the additional character string to the basic data file name is output to the control unit 70.

The user then enters basic data file name in the "Base Name" entry box in the data file name setting window through the keyboard 77.

For example, when "MOUSE" is input by the user as a basic data file name, similarly to the case of the image data produced based on the first fluorescence sample 22, the control unit 70 creates a folder having the name "MOUSE-1" in the data storing section 73 and the data file name assigning means 71 assigns a data file name "MOUSE-1-532" to the set of digital image data produced based on the second fluorescence sample 22 and stores the set of digital image data in the folder having an associated name in the data storing section 73.

To the contrary, when the user enters "HUMAN" in the "Base Name" entry box in the data file name setting window as a basic data file name, since the folder having the name "HUMAN" was previously created in the data storing section 73 when the digital image data produced based on the first fluorescence sample 22 were saved in the data storing section 73, the control unit 70 displays a message like "A folder named "HUMAN" already exists. Please enter another name." on the screen of the CRT 79, thereby advising the user to change the data file name, and displays the data file name setting window on the screen of the CRT 79.

On the other hand, in the case where the user selected the "Yes (repetitive)" button among the "Automatic Suffix Rule" selection buttons when a data file name was assigned to the set of digital image data produced based on the first fluorescence sample 22, if a data file name created by adding an additional character string to a basic data file name is to be assigned to the set of digital image data produced based on the second fluorescence sample 22 in accordance with the same naming rule, the user inputs a data file name specifying signal through the keyboard 77.

The data file name specifying signal is output to the control unit 70 and when the control unit 70 receives the data file name specifying signal, it displays the data file name setting window on the screen of the CRT 79.

When the data file name setting window is displayed on the screen of the CRT 79, the user enters a basic data file name in the "Base Name" entry box in the data file name setting window.

At this time, if the user enters "HUMAN" in the "Base Name" entry box as a basic data file name, since a folder having the name "HUMAN" was previously created in the data storing section 73 when the digital image data produced based on the first fluorescence sample 22 were saved in the data storing section 73, the control unit 70 displays a message like "A folder named "HUMAN" already exits. Please enter another name." or the like on the screen of the CRT 79, thereby advising the user to change the data file name, and displays the data file name setting window on the screen of the CRT 79.

To the contrary, when "MOUSE" is input by the user as a basic data file name, similarly to the case where the user selected the "Yes (continuative)" button among the "Automatic Suffix Rule" selection buttons and the data file name was assigned to the set of digital image data produced based on the first fluorescence sample 22, the control unit 70 creates a folder having the name "MOUSE-1" in the data storing section 73 and the data file name assigning means 71 assigns the data file name "MOUSE-1-532" to the set of digital image data produced based on the second fluorescence sample 22 and stores the set of digital image data in the folder having the associated name in the data storing section 73.

On the other hand, in the case where the user selected the "Yes (continuative)" button among the "Automatic Suffix Rule" selection buttons when a data file name was assigned to the set of digital image data produced based on the first fluorescence sample 22, if an arbitrary data file name is to be assigned without adding an additional character string to a basic data file name in accordance with the naming rule to the set of digital image data produced based on the second fluorescence sample 22, the user enters a data file name to be assigned to the set of digital image data produced based on the second fluorescence sample 22 through the keyboard 77.

Similarly to the assignment of a data file name to the set of digital image data produced based on the first fluorescence sample 22, the control unit 70 creates a folder having a name determined in accordance with the data file name the user entered in the data storing section 73 and the data file name assigning means 71 assigns, similarly to the assignment of the data file name to the set of digital image data produced based on the first fluorescence sample 22, a data file name to the set of digital image data produced based on the second fluorescence sample 22 in accordance with the data file name the user entered and stores the set of digital image data in the folder having the associated name and created by the control unit 70 in the data storing section 73.

To the contrary, in the case where the user selected the "Yes (continuative)" button among the "Automatic Suffix Rule" selection buttons when a data file name was assigned to the set of digital image data produced based on the first fluorescence sample 22, if a data file name created by adding an additional character string to a basic data file name is to be assigned the set of digital image data produced based on the second fluorescence sample 22 in accordance with a different naming rule from that used when the data file name was assigned to the set of digital image data produced based on the first fluorescence sample 22, the user inputs a data file name specifying signal through the keyboard 77.

The data file name specifying signal is output to the control unit 70 and when the control unit 70 receives the data file specifying signal, the control unit 70 displays a data file name setting window on the screen of the CRT 79.

In this case, since a data file name created by adding an additional character string to a basic data file name in accordance with a different naming rule from that used when the data file name was assigned to the set of digital image data produced based on the first fluorescence sample 22 is to be assigned, the user selects the "YES (repetitive)" button among the "Automatic Suffix Rule" selection buttons in the data file name setting window displayed on the screen of the CRT 79 and an additional character string addition rule selection signal is output to the control unit 70.

When the control unit 70 receives the additional character string addition rule selection signal, it accesses the additional character string storing means 72 to read additional character strings stored in the additional character string storing means 72 and displays a plurality of types (sets) of the additional character strings read from the additional character string storing means 72 in the "Suffix Type" display box in the data file name setting window.

When the user uses the mouse 78 to click one of the types of additional character string displayed in the "Suffix Type" display box in the data file name setting window, for example, the type "1, 2, 3, 4, 5, . . . ," an additional character string determining signal requesting addition of the type of the additional character string to the basic data file name is output to the control unit 70.

The user enters a basic data file name in the "Base Name" entry box in the data file name setting window through the keyboard 77.

For example, when the user enters "MOUSE" as a basic data file name, similarly to the case of the set of image data produced based on the first fluorescence sample 22, the control unit 70 creates a folder having the name "MOUSE-1" in the data storing section 73 and the data file name assigning means 71 assigns the data file name "MOUSE-1-532" to the set of digital image data produced based on the second fluorescence sample and stores the set of digital image data in the folder having the associated name in the data storing section 73.

To the contrary, when the user enters "HUMAN" in the "Base Name" entry box in the data file name setting window as a basic data file name, since a folder having the name "HUMAN-1" was previously created in the data storing section 73 when the set of digital image data produced based on the first fluorescence sample 22 were saved in the data storing section 73, the control unit 70 displays a message like "A folder named "HUMAN" already exists. Please enter another name." on the screen of the CRT 79, thereby advising the user to change the data file name, and displays the data file name setting window on the screen of the CRT 79.

On the other hand, in the case where the user selected the "Yes (continuative)" button among the "Automatic Suffix Rule" selection buttons when the data file name was assigned to the set of digital image data produced based on the first fluorescence sample 22, if a data file name created by adding an additional character string to a basic data file name is to be assigned to the set of digital image data produced based on the second fluorescence sample 22 in accordance with the same naming rule, the user inputs a data file name specifying signal through the keyboard 77.

In the case where the user selected the "Yes (continuative)" button among the "Automatic Suffix Rule" selection buttons when the data file name was assigned to the set of digital image data produced based on the first fluorescence sample 22, when the control unit 70 receives the data file name specifying signal, it outputs the same additional character string addition rule selection signal as that used for assigning the data file name to the set of digital image data produced based on the first fluorescence sample 22 and the additional character string determining signal to the data file name assigning means 71 and also outputs the same basic data file name "HUMAN", for example, to the data file name assigning means 71 as a basic data file name.

At the same time, the control unit 70 creates a folder having the name "HUMAN-2" in the data storing section 73 for storing the set of digital image data produced based on the second fluorescence sample 22 set in the sample carrier 21.

In the case where the data file name assigning means 71 has received the additional character string addition rule selection signal and the additional character string determining signal from the control unit 70, when it receives "HUMAN" from the control unit 70 as a basic data file name of the set of digital image data produced based on the second fluorescence sample 22, the data file name assigning means 71 assigns the data file name "HUMAN-2-532" to digital image data produced by scanning the second fluorescence sample 22 with the laser beam 4 having a wavelength of 532 nm and emitted from the second laser stimulating ray source 21 and stored in the line memory 35 and stores the set of digital image data in the folder having the name "HUMAN-2" created in the data storing section 73.

Thus, a data file name is assigned to the set of digital image data produced by scanning the second fluorescence sample 22 with the laser beam 4 having a wavelength of 532 nm and the set of digital image data is stored in the data storing section 73.

In the case where a sample carrier 21 carrying another fluorescence sample 22 is further placed on the sample stage 20 and scanned with the laser beam 4, thereby producing a set of digital image data, a folder is created similarly to the above and a data file name is assigned to the set of thus produced digital image data and the set of digital image data is stored in an associated folder in the data storing section 73.

On the other hand, in the case where digital image data for biochemical analysis are produced by scanning a stimulable phosphor layer of a stimulable phosphor sheet in which locational information of a radioactive labeling substance is recorded by closely contacting a substrate such as a membrane filter having a number of spots of a specimen selectively labeled with a radioactive labeling substance and the stimulable phosphor sheet formed with the stimulable phosphor layer containing a stimulable phosphor to expose the stimulable phosphor layer with the radioactive labeling substance with a laser beam 4 to excite the stimulable phosphor and photoelectrically detecting stimulated emission released from the stimulable phosphor, a sample carrier 21 carrying the stimulable phosphor sheet formed with the stimulable phosphor layer is set on the sample stage 20.

When the sample carrier 21 carrying the stimulable phosphor sheet formed with the stimulable phosphor layer is set on the sample stage 20, the kind of the sample carrier 21 is detected by the carrier sensor 74 and a carrier detection signal is output to the control unit 70.

When the control unit 70 receives the carrier detection signal from the carrier sensor 74, it outputs a drive signal to the switching member motor 76 based on the carrier detection signal and causes it to move the confocal switching member 31 so that the pinhole 32b having an intermediate diameter is located in the optical path.

The control unit 50 further outputs a drive signal to the filter unit motor 75 in accordance with the carrier detection signal, thereby causing it to move the filter unit 27 so that the filter 28d having a property to transmit only a light component having a wavelength of the stimulated emission and to cut off a light component having a wavelength of 640 nm is located in the optical path.

The control unit 50 then outputs a drive signal to the first laser stimulating ray source 1, thereby turning it on.

A laser beam 4 emitted from the first laser stimulating ray source 1 passes through a collimator lens 5, thereby being made a parallel beam, and is reflected by the mirror 6. The laser beam 4 reflected by the mirror 6 passes through the first dichroic mirror 7 and the second dichroic mirror 8 and enters the optical head 15.

The laser beam 4 entering the optical unit 15 is reflected by the mirror 16, passes through the hole 17 formed in the perforated mirror 18 and through the lens 19 to impinge on the sample 22, the stimulable phosphor sheet set on the sample stage 20.

Since the sample stage 20 is moved by the main scanning motor 43 in the main scanning direction indicated by the arrow X in FIG. 3 and is moved by the sub-scanning motor 47 in the sub-scanning direction indicated by the arrow Y in FIG. 3, the whole surface of the stimulable phosphor layer of the stimulable phosphor sheet set in the sample carrier 21 is scanned with the laser beam 4.

When being irradiated with the laser beam 4, a stimulable phosphor contained in the stimulable phosphor layer is excited by the laser beam 4, thereby releasing stimulated emission 25. In the stimulable phosphor sheet, since a stimulable phosphor is contained in the stimulable phosphor layer and is distributed in the depth direction of the stimulable phosphor layer to some extent, stimulated emission is released from a predetermined region in the depth direction of the stimulable phosphor layer and the positions of the light emitting points fluctuate in the depth direction. However, since the stimulable phosphor layer is thin, the distribution of the light emitting points in the depth direction is not so great as that for reading a fluorescent image carried in the transfer support.

The stimulated emission 25 released from the stimulable phosphor layer passes through the lens 19, thereby being made a parallel beam, and is reflected by the perforated mirror 18, thereby entering the filter unit 27.

Since the filter unit 27 has been moved so that the filter 28d is located in the optical path, the stimulated emission enters the filter 28d, thereby cutting light having a wavelength of 640 nm and transmitting only light having a wavelength of the stimulated emission released from the stimulable phosphor.

The stimulated emission 25 transmitted through the filter 28d is reflected by the mirror 29 and condensed by the lens 30. However, since the stimulated emission is released from a predetermined region in the depth direction of the stimulable phosphor layer, it is not focused.

Since the confocal switching member 31 has been moved prior to the irradiation with the laser beam 4 so that the pinhole 32b having an intermediate diameter is located in the optical path, the stimulated emission 25 passes through the pinhole 32b and is photoelectrically detected by the photomultiplier 33 thereby producing analog image data. Therefore, even though the confocal optical system is employed for detecting fluorescence emission 25 released from a fluorescent dye on the surface of the micro-array using the slide glass plate as a substrate with a high S/N ratio, stimulated emission 25 released from a predetermined region in the depth direction of the stimulable phosphor layer formed on the stimulable phosphor sheet can nevertheless be detected with high signal intensity.

The analog image data produced by the photomultiplier 33 are converted to a digital image data by the A/D converter 34 and the digital image data are forwarded to the line memory 35 and stored therein.

Thus, when the set of digital image data produced by scanning the stimulable phosphor layer with the laser beam 4 is stored in the line memory 35, similarly to assignment of the data file name to the set of digital image data produced based on the fluorescence sample 22, the control unit 70 creates a folder in the data storing section 73 and the data file name assigning means 71 assigns a data file name to the set of the digital image data in accordance with a data file name specified by the user and stores the digital image data in a folder having an associated name in the data storing section 73.

According to the above described embodiment, when sets of digital image data are produced by irradiating a plurality of micro-arrays, each prepared by hybridizing a substance gathered from the same living organism or the same kind of a living organism with a specific binding substance spotted on the surface of the slide glass plate, with the laser beam 4 having the wavelength of 640 nm and the laser beam 4 having a wavelength of 473 nm and photoelectrically detecting fluorescence emission released from a fluorescent dye, and data file names are assigned to the sets of digital image data and the sets of digital image data are saved, it is possible for the user to assign data file names to the sets of digital image data so as to clarify the correlation among the sets of digital image data only by inputting a common basic data file name and selecting a type of additional character string displayed in the data file name setting window. Therefore, it is unnecessary to spend time on inputting data file names which have no significant meaning and is possible to improve the efficiency of operation and the utility of the micro-array system.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, the image reading apparatus is constituted so as to produce image data for biochemical analysis by scanning a micro-array including a slide glass plate on which a number of spots of a specimen selectively labeled with a fluorescent dye are formed as a substrate with a laser beam 4 to stimulate the fluorescent dye and photoelectrically detecting fluorescence emission released from the fluorescent dye, further to produce image data for biochemical analysis by scanning a fluorescence sample including a transfer support containing denatured DNA fragments selectively labeled with a fluorescent dye as a substrate with a laser beam 4 to stimulate the fluorescent dye and photoelectrically detecting fluorescence emission released from the fluorescent dye, and to produce image data for biochemical analysis by scanning a stimulable phosphor layer of a stimulable phosphor sheet in which locational information of a radioactive labeling substance are recorded by closely contacting a substrate such as a membrane filter having a number of spots of a specimen selectively labeled with a radioactive labeling substance and the stimulable phosphor sheet formed with the stimulable phosphor layer containing a stimulable phosphor to expose the stimulable phosphor layer with the radioactive labeling substance with a laser beam 4 to excite the stimulable phosphor and photoelectrically detecting stimulated emission released from the stimulable phosphor. However, it is sufficient for the image reading apparatus to be able to produce image data for biochemical analysis by scanning a micro-array including a slide glass plate on which a number of spots of a specimen selectively labeled with a fluorescent dye are formed as a substrate with a laser beam 4 to stimulate the fluorescent dye and photoelectrically detecting fluorescence emission released from the fluorescent dye and it is not absolutely necessary for the image reading apparatus to be further constituted so as to produce image data for biochemical analysis by scanning a fluorescence sample including a transfer support containing denatured DNA fragments selectively labeled with a fluorescent dye as a substrate with a laser beam 4 to stimulate the fluorescent dye and photoelectrically detecting fluorescence emission released from the fluorescent dye, and to produce image data for biochemical analysis by scanning a stimulable phosphor layer of a stimulable phosphor sheet in which locational information of a radioactive labeling substance are recorded by closely contacting a substrate such as a membrane filter having a number of spots of a specimen selectively labeled with a radioactive labeling substance and the stimulable phosphor sheet formed with the stimulable phosphor layer containing a stimulable phosphor to expose the stimulable phosphor layer with the radioactive labeling substance with a laser beam 4 to excite the stimulable phosphor and photoelectrically detecting stimulated emission released from the stimulable phosphor.

Furthermore, in the above described embodiment, although data file names are specified and folders are created after digital image data were produced and stored in the line memory 35, the specification of data file names to be assigned to the sets of digital image data and the creation of folders may be performed at any time. For example, data file names may be specified and folders may be created prior to the scanning of a sample 22 with a laser beam 4 or data file names may be specified and folders may be created in parallel with the scanning of a sample with a laser beam 4.

Moreover, in the above described embodiment, although the naming rule includes the "continuative" mode under which additional serial character strings are assigned to sets of digital image data produced based on the micro-arrays set in different sample carriers 21 and the "repetitive" mode under which members of the same set of additional character string is repeatedly assigned to sets of digital image data produced based on the micro-arrays set in different sample carriers 21, the naming rule may include one of them.

Further, in the above described embodiment, the sample carrier 21 for carrying micro-arrays is constituted to carry five micro-arrays and, the image reading apparatus is therefore constituted so as to assign additional serial character strings to sets of digital image data produced based on a first fluorescence sample 22 to a fifth fluorescence sample 22 and assign members of the same set of additional strings to sets of digital image data produced based on a sixth fluorescence sample 22 to a tenth fluorescence sample 22. However, the number of additional character strings in a unit of repetition is not limited to five but may be arbitrarily determined and set.

Furthermore, in the above described embodiment, although an additional character string is assigned to the terminal end of a basic data file name commonly assigned, an additional character string may be assigned to the front end of a basic data file name commonly assigned.

Moreover, in the above described embodiment, in the case where micro-arrays containing a specimen labeled with Cy5 (registered trademark) and Cy3 (registered trademark) are irradiated with laser beams 4, the micro-arrays set in the first opening 51, the second opening 52, the third opening 53, the fourth opening 54 and the fifth opening 55 in the sample carrier 21 is scanned with a laser beam 4 having a wavelength of 640 nm and emitted from the first laser stimulating ray source 1 and then scanned with a laser beam 4 having a wavelength of 473 nm and emitted from the second laser stimulating ray source 2, thereby producing digital image data. However, it is possible to scan the micro-arrays set in the first opening 51, the second opening 52, the third opening 53, the fourth opening 54 and the fifth opening 55 in the sample carrier 21 with a laser beam 4 having a wavelength of 640 nm and emitted from the first laser stimulating ray source 1 or a laser beam 4 having a wavelength of 473 nm and emitted from the second laser stimulating ray source 2, thereby producing digital image data, and then scan the micro-arrays set in the first opening 51, the second opening 52, the third opening 53, the fourth opening 54 and the fifth opening 55 in the sample carrier 21 with a laser beam 4 having a wavelength of 473 nm and emitted from the second laser stimulating ray source 2 or a laser beam 4 having a wavelength of 640 nm and emitted from the first laser stimulating ray source 1.

Further, in the above described embodiment, although the specimen is labeled with two kinds of fluorescent dyes, namely, Cy5 (registered trademark) and Cy3 (registered trademark), it is not absolutely necessary for the specimen to be labeled with two kinds of fluorescent dyes and the specimen may be labeled with one kind of fluorescent dye or three or more kinds of fluorescent dyes.

Furthermore, although the keyboard 77 and the mouse 78 are used as means for inputting various signals to the control unit 70 in the above described embodiment, instead of one of them or both of them, or together with one of them or both of them, a bar code reader may be employed as an input means for scanning a bar code with light to read information contained in the bar code and inputting the read information to the control unit 70.

Moreover, although the CRT 79 is used as a display means in the above described embodiment, a display means is not limited to the CRT 79 and instead of a CRT 79, a flat display panel such as a liquid crystal display panel, an organic EL display panel or the like may be used as a display means.

According to the present invention, it is possible to provide a digital data producing system which can simply assign to sets of digital data correlated with each other file names composed of, for example, a common character string plus additional serial character strings in order to clarify the correlation between (among) the sets of digital data.

What is claimed is:

1. A digital data producing system comprising input means, data saving means for saving sets of produced digital data, additional character string storing means for storing at least two sets of additional character strings, and data file name assigning means for assigning to the sets of produced digital data data file names produced by selecting one set of additional character strings from among the at least two sets of additional character strings stored in the additional character string storing means in accordance with instructions input through the input means when a naming rule is selected and adding members of the thus selected set of additional character strings to a basic data file name.

2. A digital data producing system in accordance with claim 1, wherein a data saving region having a data region name associated with the data file names is produced in the data saving means and the sets of digital data assigned the data file names are saved in the data saving region having an associated data region name.

3. A digital data producing system in accordance with claim 1, wherein the data file name assigning means is constituted so as to serially add, when a continuative assigning mode is selected by the input means, members of the set of additional character string selected in accordance with instructions input through the input means to the basic data file name entered through the input means, thereby creating the data file names and to assign the thus created data file names to the sets of produced digital data.

4. A digital data producing system in accordance with claim 3, wherein when a continuative assigning mode is selected by the input means, defined data saving regions are serially created in the data saving means, members of the set of additional character strings selected in accordance with instructions input through the input means are serially added to the basic data file name entered through the input means, thereby creating data region names and assigning them to the data saving regions and the sets of digital data assigned the data file names are saved in the data saving regions having data region names associated with the assigned data file names.

5. A digital data producing system in accordance with claim 1, wherein the data file name assigning means is constituted so as to repeatedly with a predetermined unit of repetition and serially add, when a repetitive assigning mode is selected by the input means, members of the set of additional character string selected in accordance with instructions input through the input means to the basic data file name entered through the input means, thereby creating data file names and assign to the thus created data file names to the sets of produced digital data.

6. A digital data producing system in accordance with claim 5, wherein when a repetitive assigning mode is selected by the input means, defined data saving regions are serially created in the data saving means, members of the set of additional character strings selected in accordance with instructions input through the input means are repeatedly with a predetermined unit of repetition and serially added to the basic data file name entered through the input means, thereby creating data region names and assigning them to the data saving regions, and the sets of digital data assigned the data file names are saved in the data saving regions having data region names associated with the assigned data file names.

7. A digital data producing system in accordance with claim 1, wherein the data file name assigning means is constituted so as to create data file names in accordance with data file names entered through the input means and assign the thus created data file names to the sets of produced digital data when a naming rule is not selected.

8. A digital data producing system in accordance with claim 7, wherein a data saving region having the same data region name as a basic data file name is created in the data saving means for each basic data file name entered through the input means.

9. A digital data producing system in accordance with claim 1, which further comprises a display means and wherein the at least two sets of additional character strings stored in the additional character string storing means are displayed on the display means when the naming rule is selected.

10. A digital data producing system in accordance with claim 9, wherein the input means is constituted so as to select one set of additional character strings from among the at least two sets of the additional character strings displayed on the display means.

11. A digital data producing system in accordance with claim 9, wherein a warning is displayed on the display means when the same basic data file name as one already entered through the input means is entered through the input means.

12. A digital data producing system in accordance with claim 9, wherein the input means is constituted of a keyboard and a mouse, the basic data file name is entered through the keyboard and stored in the additional character string storing means, an additional character string selection signal is input to the data file name assigning means when the one set of additional character strings is selected by the mouse from among the at least two sets of additional character strings, and the data file name assigning means selects the one set of additional character strings from among the at least two sets of additional character strings stored in the additional character string storing means, adds them to the basic data file name to create a data file names and assigns them to the sets of produced digital data.

13. A digital data producing system in accordance with claim 1, wherein the data file name assigning means is constituted so as to add the additional character strings to the terminal end of the basic data file name entered through the input means.

14. A digital data producing system in accordance with claim 1, wherein the data file name assigning means is constituted so as to add the additional character strings to the front end of the basic data file name entered through the input means.

15. A digital data producing system in accordance with claim 1, which further comprises at least one laser stimulating ray source for emitting a laser beam, a sample stage on which at least one sample containing a labeling substance is to be placed, scanning means for moving the sample stage so that the sample placed on the sample stage can be scanned with the laser beam emitted from the at least one laser stimulating ray source, a light detector for photoelectrically detecting light released from the labeling substance contained in the sample upon being scanned with the laser beam emitted from the at least one laser stimulating ray source and excited thereby and producing analog data, and an A/D converter for digitizing the analog data produced by the light detector to produce digital data, and wherein the data file name assigning means is constituted so as to add a designation indicating wavelength of the laser beam scanning the sample to the basic data file name entered through the input means or a data file name created by adding a member of the set of additional character strings to the basic data file name entered through the input means to create a final data file name and assign the final data file name to the set of digital data produced by the A/D converter.

16. A digital data producing system in accordance with claim 15, wherein the set of digital data assigned the final data file name created by adding the designation indicating wavelength of the laser beam used for scanning the sample to the basic data file name entered through the input means or the data file name created by adding a member of the set of additional character strings to the basic data file name entered through the input means is saved in a data saving region having a data region name associated with the basic file name entered through the input means or the data file name created by adding a member of the set of additional character strings to the basic data file name entered through the input means.

17. A digital data producing system in accordance with claim 15, which comprises two or more laser stimulating ray sources for emitting laser beams having different wavelengths.

18. A digital data producing system in accordance with claim 15, wherein the data file name assigning means is constituted so as to assign data file names that differ only in the designations indicating wavelengths of the laser beams to the sets of produced digital data when the same sample is scanned with the laser beams having different wavelengths.

19. A digital data producing system in accordance with claim 5, wherein the sample carrier is constituted so as to carry a plurality of the samples and the number of members in the set of the additional character strings in a unit of repetition is set equal to the number of the samples to be carried by the sample carrier.

20. A digital data producing system in accordance with claim 1, wherein the sample is constituted as a micro-array in which a plurality of spots selectively labeled with a fluorescent dye are formed on a slide glass plate.

* * * * *